(12) United States Patent
Keller et al.

(10) Patent No.: US 11,467,670 B2
(45) Date of Patent: *Oct. 11, 2022

(54) METHODS, DEVICES, AND SYSTEMS FOR DISPLAYING A USER INTERFACE ON A USER AND DETECTING TOUCH GESTURES

(71) Applicant: META PLATFORMS TECHNOLOGIES, LLC, Menlo Park, CA (US)

(72) Inventors: Sean Jason Keller, Bellevue, WA (US); Tristan Thomas Trutna, Portland, OR (US); Hrvoje Benko, Seattle, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/354,911

(22) Filed: Jun. 22, 2021

(65) Prior Publication Data
US 2021/0311553 A1  Oct. 7, 2021

Related U.S. Application Data

(63) Continuation of application No. 17/037,488, filed on Sep. 29, 2020, now Pat. No. 11,042,221, which is a
(Continued)

(51) Int. Cl.
*G06F 3/01* (2006.01)
*G06F 1/16* (2006.01)
(Continued)

(52) U.S. Cl.
CPC .............. *G06F 3/016* (2013.01); *G06F 1/163* (2013.01); *G06F 3/011* (2013.01); *G06F 3/014* (2013.01);
(Continued)

(58) Field of Classification Search
CPC .......... G06F 3/016; G06F 1/163; G06F 3/011; G06F 3/014; G06F 3/015; G06F 3/017; G06K 19/07762; G06T 19/006
See application file for complete search history.

(56) References Cited

U.S. PATENT DOCUMENTS 9,794,691 B2  10/2017 Werris
9,797,691 B1  10/2017 Hunn et al.
(Continued)

FOREIGN PATENT DOCUMENTS

| WO | 2015102464 A1 | 7/2015 |
| WO | 2015127116 A1 | 8/2015 |
| WO | 2015199898 A1 | 12/2015 |

OTHER PUBLICATIONS

Extended European Search Report for European Application No. 19735740.3, dated Mar. 19, 2021, 8 Pages.
(Continued)

*Primary Examiner* — Sejoon Ahn
(74) *Attorney, Agent, or Firm* — Morgan, Lewis & Bockius LLP

(57) ABSTRACT

An example method of identifying a touch gesture on a user is provided. The method includes receiving, by one or more transducers of a wearable device, a set of signals that establish a signal pathway to the wearable device. The method also includes, while receiving the set of signals, determining baseline characteristics for the signal pathway, and sensing a change in the baseline characteristics caused by user interaction with an affordance of a user interface projected or perceived on the user's appendage. The method further includes, in accordance with a determination that the sensed change in the baseline characteristics satisfies a contact criterion, reporting a candidate touch event on the user's appendage to a separate electronic device that creates
(Continued)

the user interface or is in communication with another electronic device that creates the user interface.

19 Claims, 18 Drawing Sheets

Related U.S. Application Data continuation of application No. 16/241,893, filed on Jan. 7, 2019, now Pat. No. 10,824,235.

(60) Provisional application No. 62/647,559, filed on Mar. 23, 2018, provisional application No. 62/647,560, filed on Mar. 23, 2018.

(51) Int. Cl.
  *G06K 19/077* (2006.01)
  *G06T 19/00* (2011.01)
(52) U.S. Cl.
  CPC .............. *G06F 3/015* (2013.01); *G06F 3/017* (2013.01); *G06K 19/07762* (2013.01); *G06T 19/006* (2013.01)

(56) References Cited

U.S. PATENT DOCUMENTS

| | | | |
|---|---|---|---|
| 10,365,882 B2 | 7/2019 | Shin et al. | |
| 10,621,766 B2 | 4/2020 | Li | |
| 10,621,784 B2 | 4/2020 | Khan et al. | |
| 10,621,785 B2 | 4/2020 | Dorner et al. | |
| 2006/0291473 A1* | 12/2006 | Chase | H04L 45/50 370/395.5 |
| 2007/0208981 A1* | 9/2007 | Restrepo | H02H 1/0015 714/731 |
| 2008/0009764 A1 | 1/2008 | Davies | |
| 2012/0290976 A1 | 11/2012 | Lahm et al. | |
| 2014/0003409 A1 | 1/2014 | Van De Laar et al. | |
| 2014/0125571 A1 | 5/2014 | Um et al. | |
| 2014/0125577 A1 | 5/2014 | Hoang et al. | |
| 2015/0227245 A1 | 8/2015 | Inagaki et al. | |
| 2015/0317885 A1 | 11/2015 | Ramstein et al. | |
| 2016/0011668 A1 | 1/2016 | Gilad-Bachrach et al. | |
| 2016/0018948 A1 | 1/2016 | Parvarandeh et al. | |
| 2016/0019762 A1 | 1/2016 | Levesque et al. | |
| 2016/0088380 A1 | 3/2016 | Stauber et al. | |
| 2016/0094936 A1 | 3/2016 | Yang et al. | |
| 2016/0100034 A1 | 4/2016 | Miller | |
| 2016/0306932 A1 | 10/2016 | Fateh et al. | |
| 2016/0313798 A1 | 10/2016 | Connor | |
| 2016/0357261 A1 | 12/2016 | Bristol et al. | |
| 2017/0056115 A1 | 3/2017 | Corndorf et al. | |
| 2017/0090865 A1 | 3/2017 | Armstrong-Muntner et al. | |
| 2017/0097753 A1 | 4/2017 | Bailey et al. | |
| 2017/0102771 A1 | 4/2017 | Lei | |
| 2017/0115733 A1 | 4/2017 | Du | |
| 2017/0123487 A1 | 5/2017 | Hazra et al. | |
| 2017/0196513 A1 | 7/2017 | Longinotti-Buitoni et al. | |
| 2017/0220005 A1 | 8/2017 | Han et al. | |
| 2017/0365102 A1 | 12/2017 | Huston et al. | |
| 2019/0286232 A1 | 9/2019 | De Nardi et al. | |
| 2021/0272362 A1* | 9/2021 | Park | H04L 12/282 |

OTHER PUBLICATIONS

Extended European Search Report for European Application No. 19735975.5, dated Mar. 19, 2021, 8 Pages.
Extended European Search Report for European Application No. 19736069.6, dated Jan. 29, 2021, 6 Pages.
Extended European Search Report for European Application No. 19736185.0, dated Feb. 3, 2021, 6 Pages.
Final Office Action dated Nov. 26, 2020 for U.S. Appl. No. 16/856,956, filed Apr. 23, 2020, 21 pages.
International Preliminary Report Patentability for International Application No. PCT/US2019/012697, dated Jul. 23, 2020, 9 Pages.
International Preliminary Report Patentability for International Application No. PCT/US2019/012702, dated Oct. 8, 2020, 10 Pages.
International Preliminary Report Patentability for International Application No. PCT/US2019/012718, dated Oct. 8, 2020, 7 Pages.
International Preliminary Report Patentability for International Application No. PCT/US2019/012721, dated Jul. 23, 2020, 9 Pages.
International Search Report and Written Opinion for International Application No. PCT/US2019/012697, dated Apr. 29, 2019, 10 Pages.
International Search Report and Written Opinion for International Application No. PCT/US2019/012702, dated Apr. 29, 2019, 11 Pages.
International Search Report and Written Opinion for International Application No. PCT/US2019/012718, dated May 3, 2019, 10 Pages.
International Search Report and Written Opinion for International Application No. PCT/US2019/012721, dated Apr. 29, 2019, 10 Pages.
Non-Final Office Action dated Apr. 2, 2020 for U.S. Appl. No. 16/241,890, filed Jan. 7, 2019, 8 pages.
Non-Final Office Action dated May 28, 2021 for U.S. Appl. No. 16/856,956, filed Apr. 23, 2020, 17 Pages.
Non-Final Office Action dated Oct. 30, 2019 for U.S. Appl. No. 16/241,871, filed Jan. 7, 2019, 14 pages.
Notice of Allowance dated Feb. 21, 2020 for U.S. Appl. No. 16/241,900, filed Jan. 7, 2019, 11 pages.
Notice of Allowance dated Feb. 28, 2020 for U.S. Appl. No. 16/241,871, filed Jan. 7, 2019, 8 pages.
Notice of Allowance dated Aug. 31, 2020 for U.S. Appl. No. 16/241,893, filed Jan. 7, 2019, 14 pages.
Pang D-C., et al., "A Transparent Capacitive Micromachined Ultrasonic Transducer (CMUT) Array for Finger Hover-Sensing Dial Pads," 19th International Conference on Solid-State Sensors, Actuators and Microsystems (TRANSDUCERS), Kaohsiung, Taiwan: IEEE, Jun. 18-22, 2017, pp. 2171-2174.
Zhang Y., et al., "SkinTrack: Using the Body as an Electrical Waveguide for Continuous Finger Tracking on the Skin," ACM, 2016, 13 pages.
Notice of Allowance dated Apr. 25, 2022 for U.S. Appl. No. 16/856,956, filed Apr. 23, 2020, 5 pages.
Office Action dated May 12, 2022 for European Patent Application No. 19736069.6, filed Jan. 8, 2019, 6 pages.

* cited by examiner

METHODS, DEVICES, AND SYSTEMS FOR DISPLAYING A USER INTERFACE ON A USER AND DETECTING TOUCH GESTURES

CROSS-REFERENCE TO RELATED APPLICATIONS

This application is a continuation of U.S. application Ser. No. 17/037,488, filed Sep. 29, 2020, entitled "Methods, Devices, and Systems for Displaying a User Interface on a User and Detecting Touch Gestures," which is a continuation of U.S. application Ser. No. 16/241,893, filed Jan. 7, 2019, entitled "Methods, Devices, and Systems for Displaying a User Interface on a User and Detecting Touch Gestures," now U.S. Pat. No. 10,824,235, which claims priority to (i) U.S. Provisional Application No. 62/647,559, filed Mar. 23, 2018, entitled "Methods, Devices, and Systems for Determining Contact On a User of a Virtual Reality and/or Augmented Reality Device," and (ii) U.S. Provisional Application No. 62/647,560, filed Mar. 23, 2018, entitled "Methods, Devices, and Systems for Projecting an Image Onto a User and Detecting Touch Gestures," each of which is incorporated by reference herein in its entirety.

This application is related to U.S. Utility patent application Ser. No. 16/241,871, filed Jan. 7, 2019, entitled "Methods, Devices, and Systems for Creating Haptic Stimulations and Tracking Motion of a User," U.S. Utility patent application Ser. No. 16/241,890, filed Jan. 7, 2019, entitled "Methods, Devices, and Systems for Determining Contact On a User of a Virtual Reality and/or Augmented Reality Device," and U.S. Utility patent application Ser. No. 16/241,900, filed Jan. 7, 2019, entitled "Methods, Devices, and Systems for Creating Localized Haptic Stimulations on a User," each of which is incorporated by reference herein in its entirety.

TECHNICAL FIELD

This relates generally to virtual reality/augmented reality, including but not limited to projecting images onto a user and detecting gestures on the user relating to the projection.

BACKGROUND

Virtual reality (VR) and/or augmented reality (AR) technologies allow users to interact with technologies in different ways. VR and/or AR allows a user to tactilely interact with the digital world. Users may experience haptic responses from electronic devices, allowing users a rich experience. Wearable devices for VR and/or AR may allow users to interact with the digital world through a medium distinct from an electronic device's screen (e.g., a wearable device projects an image onto a user's forearm using, e.g., augmented reality). However, determining a location of a gesture on the projected image with sufficient precision presents a challenge.

SUMMARY

Accordingly, there is a need for methods, devices, and systems for projecting virtual images onto a user with sufficient fidelity in determining whether a contact or gesture has occurred. One solution is to combine computer vision (e.g., a camera on a wearable device) and a separate modality (e.g., a wearable wristband having one or more transducers) for increased fidelity in determining a location and/or pressure of a gesture (e.g., contact).

In some embodiments, the solution explained above can be implemented on a wearable device that includes a plurality of transducers (e.g., actuators). The wearable device in some instances is worn on the user's wrist (or various other body parts) and is used to project an image onto a portion of the user's body, essentially creating a virtual or augmented reality display on the user's body. In some embodiments, the wearable device may virtualize an image to be seen through a lens of the wearable device as though the image were projected onto the user. Moreover, the wearable device can be in communication with a host system (e.g., a virtual reality device and/or an augmented reality device, among others), and the wearable device can display images based on instructions from the host system. As an example, the host system may display video data to a user (e.g., may instruct a head-mounted display to display the video data), and the host system may also instruct the wearable device to project images from the video onto the user's body.

The devices, systems, and methods described herein provide benefits including but not limited to: (i) detecting a touch gesture on a projected and/or virtual image by an appendage of a user, (ii) determining a location of a touch gesture on a projected image on a user's body, (iii) the wearable device does not encumber free motion of a user's hand and/or wrist (or other body parts), and (iv) multiple wearable devices can be used simultaneously.

(A1) In accordance with some embodiments, a method is performed at a first wearable device that includes a projector and a plurality of transducers. The method includes projecting an image onto a portion of a first appendage of a user of the first wearable device and detecting a touch gesture on the image by a second appendage of the user distinct from the first appendage. The method further includes at a second wearable device having a camera and a processor, determining a location of the touch gesture on the image where a computer system is instructed to perform an operation in accordance with the detecting and the location. In some embodiments, the first wearable device is attached to an appendage (e.g., wrist, forearm, bicep, thigh, ankle, etc.) of the user and the second wearable device is worn on the head of the user (e.g., head-mounted display).

(A2) In some embodiments of the method of A1, further including, at the second wearable device, confirming, via the camera and the processor, that the detected touch gesture has occurred on the image by the second appendage of the user. The computer system is instructed to perform the operation in further accordance with the confirming.

(A3) In some embodiments of the method of any of A1-A2, the plurality of transducers is a first plurality of transducers that can each generate one or more signals and the first wearable device further comprises a first control circuit coupled to the first plurality of transducers. Moreover, the method further includes generating, via the first plurality of transducers, signals that couple/vibrate into at least a portion of the first appendage of the user of the first wearable device.

(A4) In some embodiments of the method of A3, further including receiving, via a second plurality of transducers of a third wearable device, at least a portion of the signals generated by the first plurality of transducers when the first appendage of the user is within a threshold distance from the third wearable device, wherein the user is wearing the third wearable device on a second appendage. The method also includes in response to the receiving, determining, via a second control circuit of the third wearable device, a position of a portion of the first appendage with respect to a position of the third wearable device. The computer system is instructed to perform an operation in accordance with the detecting, the position, and the location.

(A5) In some embodiments of the method of any of A1-A4, the touch gesture is a swipe gesture.

(A6) In some embodiments of the method of any of A1-A4, the touch gesture is a tap gesture.

(A7) In some embodiments of the method of any of A1-A4, the touch gesture is a pinch gesture.

(A8) In some embodiments of the method of any of A1-A7, the image is a video stream.

(A9) In some embodiments of the method of any of A1-A8, the first appendage is a first arm of the user and the second appendage is a second arm of the user.

(A10) In another aspect, a system is provided that includes a first wearable device, a second wearable device, a third wearable device, and a computer system, and the system is configured to perform the method steps described above in any of A1-A9.

(A11) In yet another aspect, one or more wearable devices are provided and the one or more wearable devices include means for performing the method described in any one of A1-A9.

(A12) In still another aspect, a non-transitory computer-readable storage medium is provided (e.g., as a memory device, such as external or internal storage, that is in communication with a wearable device). The non-transitory computer-readable storage medium stores executable instructions that, when executed by a wearable device with one or more processors/cores, cause the wearable device to perform the method described in any one of A1-A9.

(B1) In accordance with some embodiments, another method is performed at a first wearable device, attached to a first appendage of a user, that includes one or more transducers. The method includes receiving, by the one or more transducers, a set of signals transmitted by a second wearable device attached to the user, wherein (i) receiving the set of signals creates a signal pathway between the first and second wearable devices, and (ii) signals in the set of signals propagate through at least the user's first appendage. The method also includes determining baseline characteristics for the signal pathway created between the first wearable device and the second wearable device and sensing a change in the baseline characteristics while receiving the set of signals. The method also includes, in accordance with a determination that the sensed change in the baseline characteristics for the signal pathway satisfies a contact criterion, reporting a candidate touch event on the user's first appendage. In some embodiments, the contact criterion includes a touch criterion and a hover criterion. In such embodiments, a sensed change in the baseline characteristics caused by finger hovering event may satisfy the hover criterion but will not satisfy the touch criterion.

(B2) In some embodiments of the method of B1, reporting the candidate touch event comprises sending transducer data corresponding to the sensed change in the baseline characteristics to a computer system. In some embodiments, the transducer data also includes a time stamp of when the sensed change in the baseline characteristics occurred. In some embodiments, reporting the candidate touch event includes sending, to the computer system, a message reporting the candidate touch event.

(B3) In some embodiments of the method of B2, the computer system displays, on the user's first appendage, a user interface that includes one or more affordances, and the candidate touch event reported by the first wearable device is associated with a first affordance of the one or more affordances included in the user interface.

(B4) In some embodiments of the method of any of B2-B3, further including determining an approximate location of the candidate touch event on the user's first appendage based, at least in part, on the sensed change in the baseline characteristics. The transducer data sent to the computer system further comprises information indicating the approximate location of the candidate touch event.

(B5) In some embodiments of the method of B2, the transducer data sent to the computer system also indicates an approximate location of the candidate touch event on the user's first appendage.

(B6) In some embodiments of the method of any of B3-B5, the computer system: (i) captures, via one or more cameras, the candidate touch event, (ii) generates image data according to the capturing of the candidate touch event, and (iii) executes a function associated with the first affordance of the user interface after processing the transducer data and the image data.

(B7) In some embodiments of the method of any of B1-B6, the baseline characteristics include a baseline phase value. Furthermore, sensing the change in the baseline characteristics for the signal pathway comprises detecting a phase value of the signal pathway that differs from the baseline phase value.

(B8) In some embodiments of the method of B7, the contact criterion includes a phase difference threshold. Furthermore, reporting the candidate touch event is performed in accordance with a determination that a difference between the phase value and the baseline phase value satisfies the phase difference threshold.

(B9) In some embodiments of the method of any of B1-B8, the baseline characteristics include a baseline amplitude value. Furthermore, sensing the change in the baseline characteristics for the signal pathway comprises detecting an amplitude value of the signal pathway that differs from the baseline amplitude value.

(B10) In some embodiments of the method of B9, the contact criterion includes an amplitude difference threshold. Furthermore, reporting the candidate touch event is performed in accordance with a determination that a difference between the amplitude value and the baseline amplitude value satisfies the amplitude difference threshold.

(B11) In some embodiments of the method of any of B1-B10, the baseline characteristics include a baseline amplitude value and a baseline phase value. Furthermore, sensing the change in the baseline characteristics for the signal pathway comprises detecting (i) an amplitude value of the signal pathway that differs from the baseline amplitude value, and (ii) a phase value of the signal pathway that differs from the baseline phase value.

(B12) In some embodiments of the method of B11, the contact criterion includes an amplitude difference threshold and a phase difference threshold. Furthermore, reporting the candidate touch event is performed in accordance with a determination that: (i) a difference between the amplitude value and the baseline amplitude value satisfies the amplitude difference threshold, and (ii) a difference between the phase value and the baseline phase value satisfies the phase difference threshold.

(B13) In some embodiments of the method of any of B1-B12, the contact criterion includes a time threshold. Furthermore, sensing the change in the baseline characteristics comprises sensing the change for a period of time and reporting the candidate touch event is performed in accordance with a determination that the period of time satisfies the time threshold. Alternatively, in some embodiments, the first wearable device continually sends transducer data to the computer device.

(B14) In some embodiments of the method of any of B1-B13, further including, before receiving the set of signals, receiving a plurality predetermined values for signals characteristics. Each of the predetermined values for the signals characteristics corresponds to a specific location of the first appendage of the user. In some embodiments, the transducer data of (B2) includes signals characteristics (e.g., values of phase, amplitude, etc.) that substantially match one of the plurality predetermined values for signals characteristics.

(B15) In some embodiments of the method of any of B1-B14, the candidate touch event is selected from the group consisting of a tap gesture, press-and-holder gesture, a swipe gesture, a drag gesture, a multi-tap gesture, a pinch gesture, a pull gesture, and a twist gesture.

(B16) In some embodiments of the method of any of B1-B15, reporting the candidate touch event comprises sending, to a computer system, data associated with the sensed change in the signal pathway, and the computer system determines whether the user intended to interact with an affordance of a user interface displayed on the user's first appendage based, at least in part, on the data associated with the sensed change in the signal pathway. For example, the computer system displays the user interface on the user's first appendage, and the candidate touch event reported by the first wearable device is associated with one of the affordances included in the user interface.

(B17) In some embodiments of the method of B16, the computer system (i) captures, via one or more cameras, an approximate location of the candidate touch event, the approximate location of the candidate touch event corresponding to a location of the affordance in the user interface displayed on the user's first appendage, and (ii) executes a function associated with the affordance in response to determining that the user intended to interact with the first affordance and in accordance with the approximate location of the candidate touch event.

(B18) In some embodiments of the method of any of B1-B17, the computer system is an artificial-reality system selected from the group consisting of an augmented-reality system, a virtual-reality system, and a mixed-reality system.

(B19) In yet another aspect, a wearable device is provided and the wearable device includes means for performing the method described in any one of B1-B18 and F1-F2.

(B20) In another aspect, a wearable device that includes one or more transducers is provided. In some embodiments, the wearable device is in communication with one or more processors and memory storing one or more programs which, when executed by the one or more processors, cause the wearable device to perform the method described in any one of B1-B18 and F1-F2.

(B21) In still another aspect, a non-transitory computer-readable storage medium is provided (e.g., as a memory device, such as external or internal storage, that is in communication with a wearable device). The non-transitory computer-readable storage medium stores executable instructions that, when executed by a wearable device with one or more processors/cores, cause the wearable device to perform the method described in any one of B1-B18 and F1-F2.

(B22) In still another aspect, a system is provided. The system includes a first wearable device, a second wearable device, and a computer system that are configured to perform the method described in any one of B1-B18 and F1-F2.

In some embodiments, the second wearable device and the computer system are part of the same device while in other embodiments they are separate devices.

(C1) In accordance with some embodiments, another method is performed at an artificial-reality system (e.g., AR system 1200, FIG. 12; VR system 1300, FIG. 13), worn by a user, that includes a head-mounted display, one or more cameras, and at least one processor. The method includes (i) providing first instructions to the head-mounted display to display a user interface on a first appendage of the user, wherein the user is also wearing, on a first appendage, a first wearable device that is in communication with the artificial-reality system, and (ii) providing second instructions to a second wearable device to emit one or more signals, wherein the one or more signals propagate through at least the first appendage of the user and are received by the first wearable device, thereby creating a signal pathway between the first wearable device and the second wearable device. The method also includes (i) receiving, from the first wearable device, data associated with the signal pathway created between the first wearable device and the second wearable device, and (ii) capturing, by the one or more cameras, a candidate touch event at a location on the user's first appendage, wherein the location is associated with an affordance of the user interface. Thereafter, the method includes determining whether the user intended to interact with the affordance of the user interface based, at least in part, on the data associated with the signal pathway, and in response to determining that the user intended to interact with the affordance and in accordance with the captured location of the candidate touch event, executing a function associated with the affordance.

(C2) In some embodiments of the method of C1, displaying the user interface on the first appendage of the user includes: (i) projecting the user interface on the user's first appendage, or (ii) presenting, using augmented reality, the user interface on the head-mounted display so that the user perceives the user interface on the first appendage.

(D1) In accordance with some embodiments, another method is performed at an artificial-reality system (e.g., AR system 1200, FIG. 12; VR system 1300, FIG. 13), worn by a user, that includes a head-mounted display, one or more cameras, and at least one processor. The method includes, while displaying a user interface on a first appendage of the user: (i) capturing, via the one or more cameras, a candidate touch event at a location on a user's first appendage, wherein the location is associated with an affordance of the user interface, and (ii) receiving, from a first wearable device worn by the user, data associated with the candidate touch event, wherein the first wearable device is attached to the user's first appendage. The method also includes determining whether the user's first appendage was touched based at least in part on the received data, and in accordance with a determination that the user's first appendage was touched and based on the captured location of the candidate touch event, executing a function associated with the affordance of the user interface.

(D2) In some embodiments of the method of D1, the user interface is displayed on the first appendage of the user by: (i) projecting the user interface on the user's first appendage, or (ii) presenting, using augmented reality, the user interface on the head-mounted display so that the user perceives the user interface on the first appendage.

(D3) In some embodiments of the method of any of D1-D2, the first wearable device performs the method described in any one of B1-B15 to generate the data received by the artificial-reality system.

(E1) In yet another aspect, an artificial-reality system is provided and the artificial-reality system includes means for performing the method described in any one of C1-C2 and D1-D2.

(E2) In another aspect, an artificial-reality system that includes a head-mounted display and one or more cameras is provided. In some embodiments, the artificial-reality system is in communication with one or more processors and memory storing one or more programs which, when executed by the one or more processors, cause the artificial-reality system to perform the method described in any one of C1-C2 and D1-D2.

(E3) In still another aspect, a non-transitory computer-readable storage medium is provided (e.g., as a memory device, such as external or internal storage, that is in communication with an artificial-reality system). The non-transitory computer-readable storage medium stores executable instructions that, when executed by an artificial-reality system with one or more processors/cores, cause the artificial-reality system to perform the method described in any one of C1-C2 and D1-D2.

(F1) In accordance with some embodiments, another method is performed at a first wearable device, attached to a first appendage of a user, that includes one or more transducers. The method includes (i) receiving, by the one or more transducers, a set of waves (e.g., signals) transmitted by a second wearable device attached to the user, wherein waves in the set of waves travel from the second wearable device to the first wearable device through the first appendage of the user, (ii) after receiving the set of waves, determining first values for one or more waveform characteristics of the set of waves, and (iii) identifying a location of a touch gesture on the first appendage of the user based on the first values for the one or more waveform characteristics of the set of waves. In some embodiments, the one or more waveform characteristics includes at least values for phase and amplitude.

(F2) In some embodiments of the method of F1, further including reporting the location of the touch gesture to a computer system (e.g., computer system 130, FIG. 1A).

(F3) In some embodiments of the method of any of F1-F2, the first wearable device performs the method described in any one of B2-B15.

In accordance with some embodiments, a plurality of wearable device each includes one or more processors/cores and memory storing one or more programs configured to be executed by the one or more processors/cores. The one or more programs in each wearable devices includes instructions for performing one or more of the operations of the method described above. In accordance with some embodiments, a non-transitory computer-readable storage medium has stored therein instructions that, when executed by one or more processors/cores of a wearable device, cause the wearable device to perform some of the operations of the method described above (e.g., operations of the first wearable device or the second wearable device). In accordance with some embodiments, a system includes a wearable device (or multiple wearable devices), a head-mounted display (HMD), and a computer system to provide video/audio feed to the HMD and instructions to the wearable device.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first wearable device could be termed a second wearable device, and, similarly, a second wearable device could be termed a first wearable device, without departing from the scope of the various described embodiments. The first wearable device and the second wearable device are both wearable devices, but they are not the same wearable devices, unless specified otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1A:
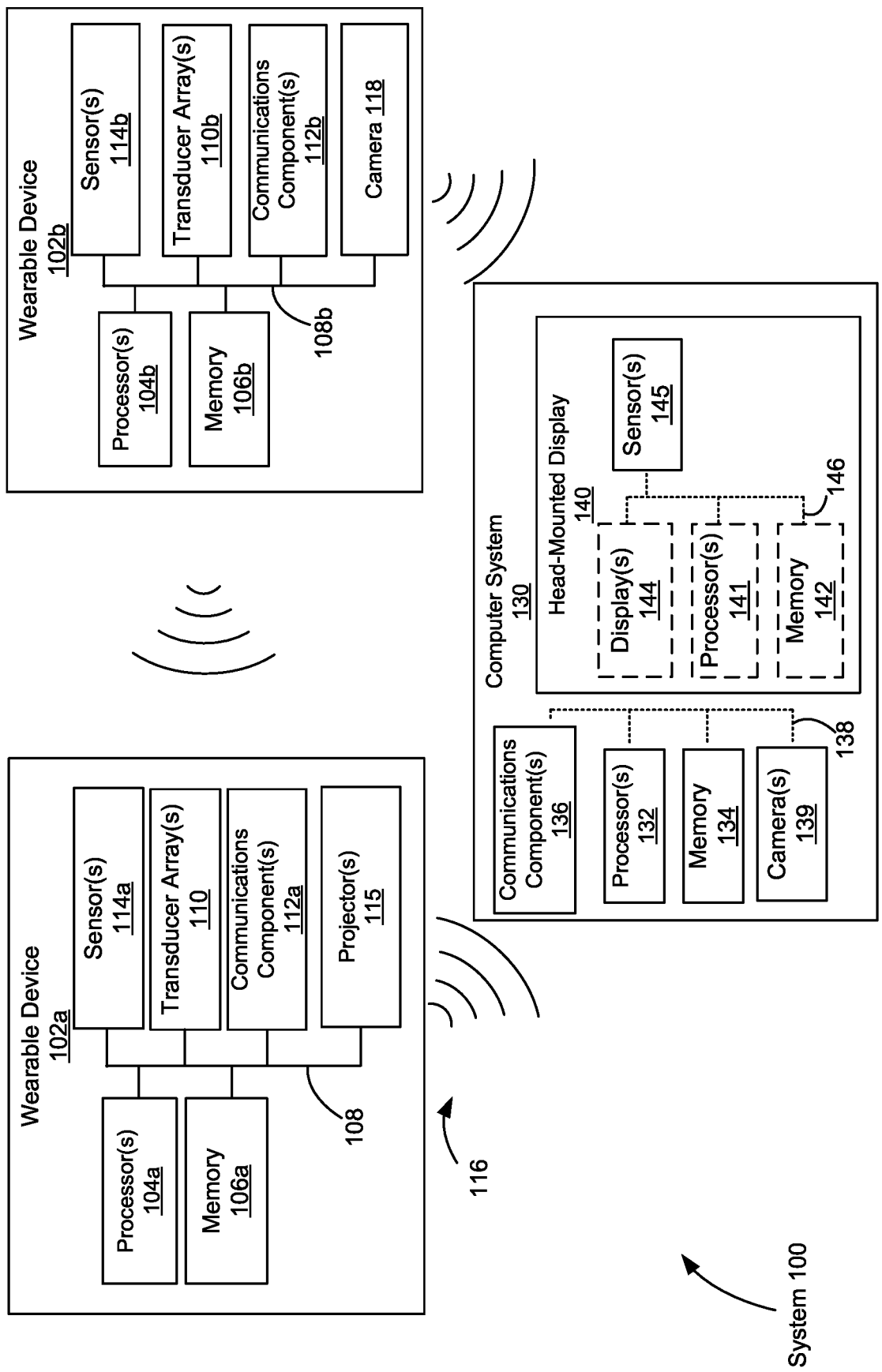
FIG. 1A is a block diagram illustrating an exemplary projection system, in accordance with various embodiments.

FIG. 1 is a block diagram illustrating a system 100, in accordance with various embodiments. While some example features are illustrated, various other features have not been illustrated for the sake of brevity and so as not to obscure pertinent aspects of the example embodiments disclosed herein. To that end, as a non-limiting example, the system 100 includes wearable devices 102a, 102b, which are used in conjunction with a computer system 130 (e.g., a host system or a host computer). In some embodiments, the system 100 provides the functionality of a virtual reality device with image projection, an augmented reality device with image projection, a combination thereof, or provides some other functionality. The system 100 is described in greater detail below with reference FIGS. 11-13.

An example wearable device 102 (e.g., wearable device 102a) includes, for example, one or more processors/cores 104 (referred to henceforth as "processors"), a memory 106, one or more transducer arrays 110, one or more communications components 112, projector(s) 115, and/or one or more sensors 114. In some embodiments, these components are interconnected by way of a communications bus 108. References to these components of the wearable device 102 cover embodiments in which one or more of these components (and combinations thereof) are included. In some embodiments, the one or more sensors 114 are part of the one or more transducer arrays 110 (e.g., transducers in the transducer arrays 110 also perform the functions of the one or more sensors 114, discussed in further detail below). For example, one or more transducers in the transducer array 110 may be electroacoustic transducers configured to detect acoustic waves (e.g., ultrasonic waves).

Another example wearable device 102 (e.g., wearable device 102b) includes, for example, one or more processors/cores 104 (referred to henceforth as "processors"), a memory 106, one or more transducer arrays 110, one or more communications components 112, camera(s) 118, and/or one or more sensors 114. In some embodiments, these components are interconnected by way of a communications bus 108. References to these components of the wearable device 102 cover embodiments in which one or more of these components (and combinations thereof) are included. In some embodiments, the one or more sensors 114 are part of the one or more transducer arrays 110 (e.g., transducers in the transducer arrays 110 also perform the functions of the one or more sensors 114, discussed in further detail below). For example, one or more transducers in the transducer array 110 may be electroacoustic transducers configured to detect acoustic waves (e.g., ultrasonic waves).

In some embodiments, a single processor 104 (e.g., processor 104 of the wearable device 102a) executes software modules for controlling multiple wearable devices 102 (e.g., wearable devices 102b . . . 102n). In some embodiments, a single wearable device 102 (e.g., wearable device 102a) includes multiple processors 104, such as one or more wearable device processors (configured to, e.g., generate an image for projection), one or more communications component processors (configured to, e.g., control communications transmitted by communications component 112 and/or receive communications by way of communications component 112) and/or one or more sensor processors (configured to, e.g., control operation of sensor 114 and/or receive output from sensor 114).

Figure 4A:
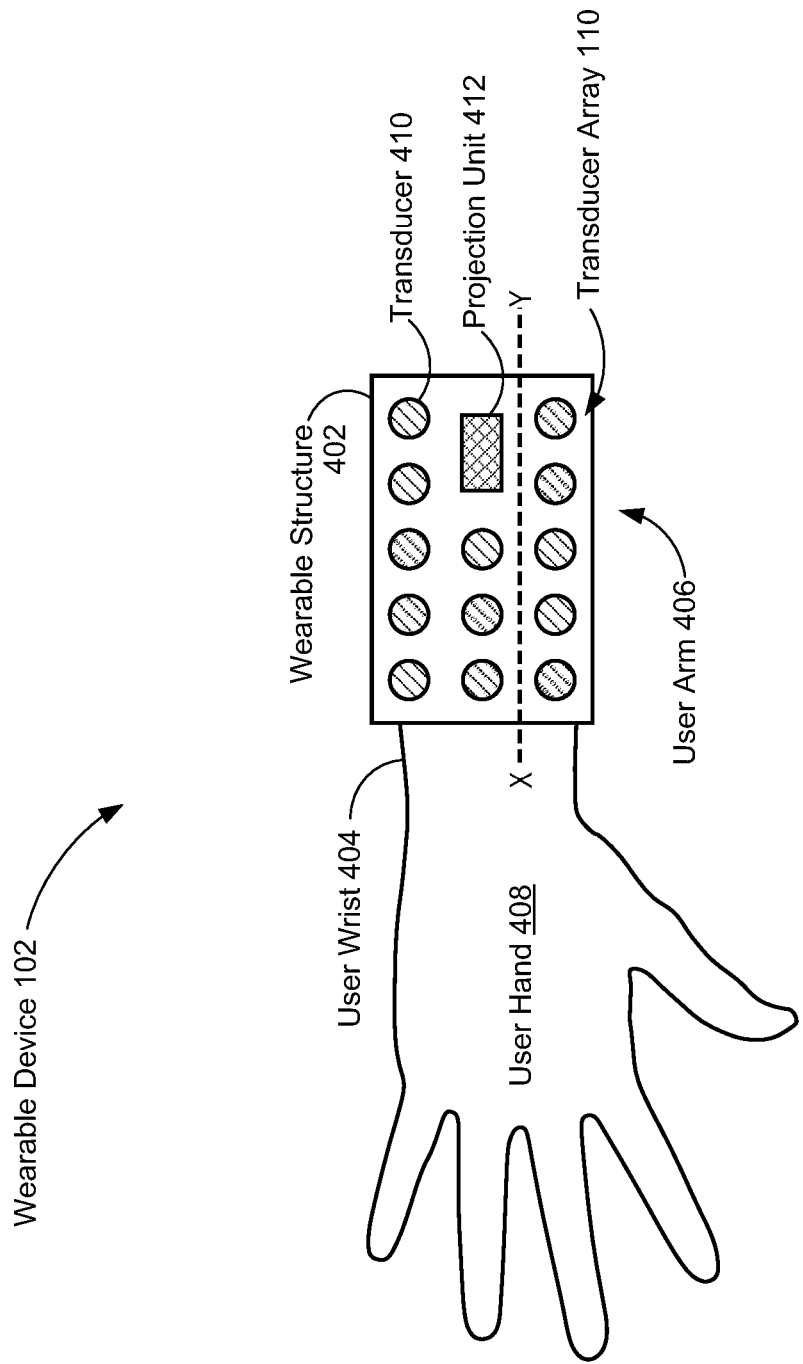
FIG. 4A is an exemplary view of a wearable device on a user's wrist, in accordance with some embodiments.
Figure 6A:
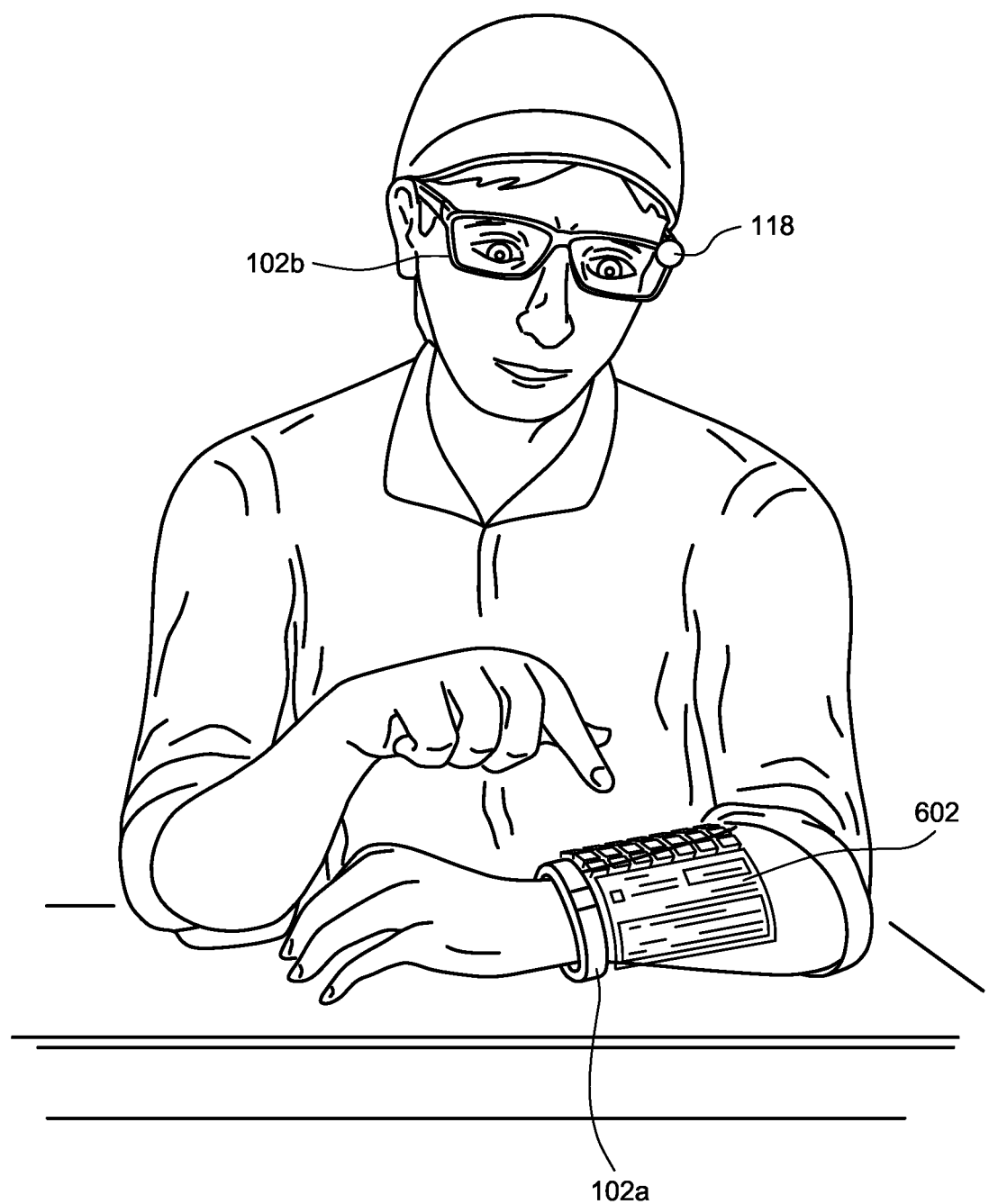
FIG. 6A is an exemplary view of a wearable device on a user's wrist and on the user's head, in accordance with some embodiments.

In some embodiments, the wearable device 102 is configured to project image(s) 602 (as shown in FIG. 6A) via the projector(s) 115 within projection unit 412 (shown in FIG. 4A). In such embodiments, the wearable device 102 is configured to generate and project images (e.g., a keyboard or the like) onto the user's own appendage using, e.g., one or more of the one or more projectors 115. The AR system 1100 (FIG. 11) shows an example wearable device that can project images (at least in some embodiments).

In some other embodiments, the wearable device 102 does not project images and instead the computer system 130 (and the head-mounted display 140) is (are) responsible for projecting images onto the user's own appendage. Alternatively, in some embodiments, the computer system 130 (and the head-mounted display 140) uses augmented reality so that the user perceives images on his or her own appendage, but nothing is actually projected. AR system 1200 (FIG. 12) and VR system 1300 (FIG. 13) can be used to project/display images onto the user or areas around the user.

In some embodiments, the transducers in a respective transducer array 110 are miniature piezoelectric actuators/devices, vibrotactile actuators, or the like. In some embodiments, the transducers in a respective transducer array 110 are single or multipole voice coil motors, or the like. Each transducer array 110 is configured to generate and transmit signals 116 in response to being activated by the wearable device (e.g., via processors 104 or some other controller included in the wearable device 102). In some embodiments, the signals 116 are mechanical waves (e.g., sound waves, ultrasonic waves, or various other mechanical waves). A mechanical wave is an oscillation of matter that transfers energy through a medium. As discussed herein, the "medium" is the wearer's skin, flesh, bone, blood vessels, etc. It is noted that any device capable of producing mechanical waves (or alternating current signals) can be used as a transducer in the disclosed wearable device 102. It is also noted that signals (e.g., waves) that propagate through the medium (e.g., the user's flesh) are said herein to "couple" to the medium or "couple into" the medium.

In some embodiments, the wearable device 102 (e.g., wearable device 102a, 102b) is a receiver and transmitter of one or more signals. For example, in addition to transmitting signals (e.g., mechanical waves), as described above, the wearable device 102 is also configured to receive (e.g., detect, sense) signals transmitted by itself or by another wearable device 102. To illustrate, a first wearable device 102a may transmit a plurality of signals through a medium, such as the wearer's body, and a second wearable device 102b (attached to the same wearer) may receive at least some of the signals transmitted by the first wearable device 102a through the medium. Furthermore, a wearable device 102 receiving transmitted signals may use the received signals to determine that a user contacted a particular part of his or her body. To illustrate, the second wearable device 102b may initially receive signals transmitted by the first wearable device 102a through the medium that have a first set of parameters (e.g., values of phase, amplitude, frequency, etc.). The second wearable device 102b may use these initial signals to form a normalized baseline. Thereafter, the wearer of the first and second wearable devices 102 may contact (e.g., touch) a region of her body (e.g., forearm) through which the transmitted signals are travelling. By touching her forearm for example, the wearer alters the signals travelling through her forearm, and in turn the first set of parameters associated with the signals (e.g., values of one or more of phase, amplitude, frequency, etc. may change). Importantly, the second wearable device 102b then receives (e.g., detects, senses) these altered signals and can subsequently determine that the user contacted a particular part of her body, e.g., her forearm. The second wearable device 102b may further determine that the user contacted a specific part of her forearm (e.g., a change in the phase value by a certain amount from the normalized baseline may indicate that a specific part of her forearm was touched).

The computer system 130 is a computing device that executes virtual reality applications and/or augmented reality applications to process input data from the sensors 145 on the head-mounted display 140 and the sensors 114 on the wearable device 102. The computer system 130 provides output data to at least (i) the electronic display 144 on the head-mounted display 140 and (ii) the wearable device 102 (e.g., processors 104 of the haptic device 102, FIG. 2A). An exemplary computer system 130, for example, includes one or more processor(s)/core(s) 132, memory 134, one or more communications components 136, and/or one or more cameras 139. In some embodiments, these components are interconnected by way of a communications bus 138. References to these components of the computer system 130 cover embodiments in which one or more of these components (and combinations thereof) are included.

Figure 11:
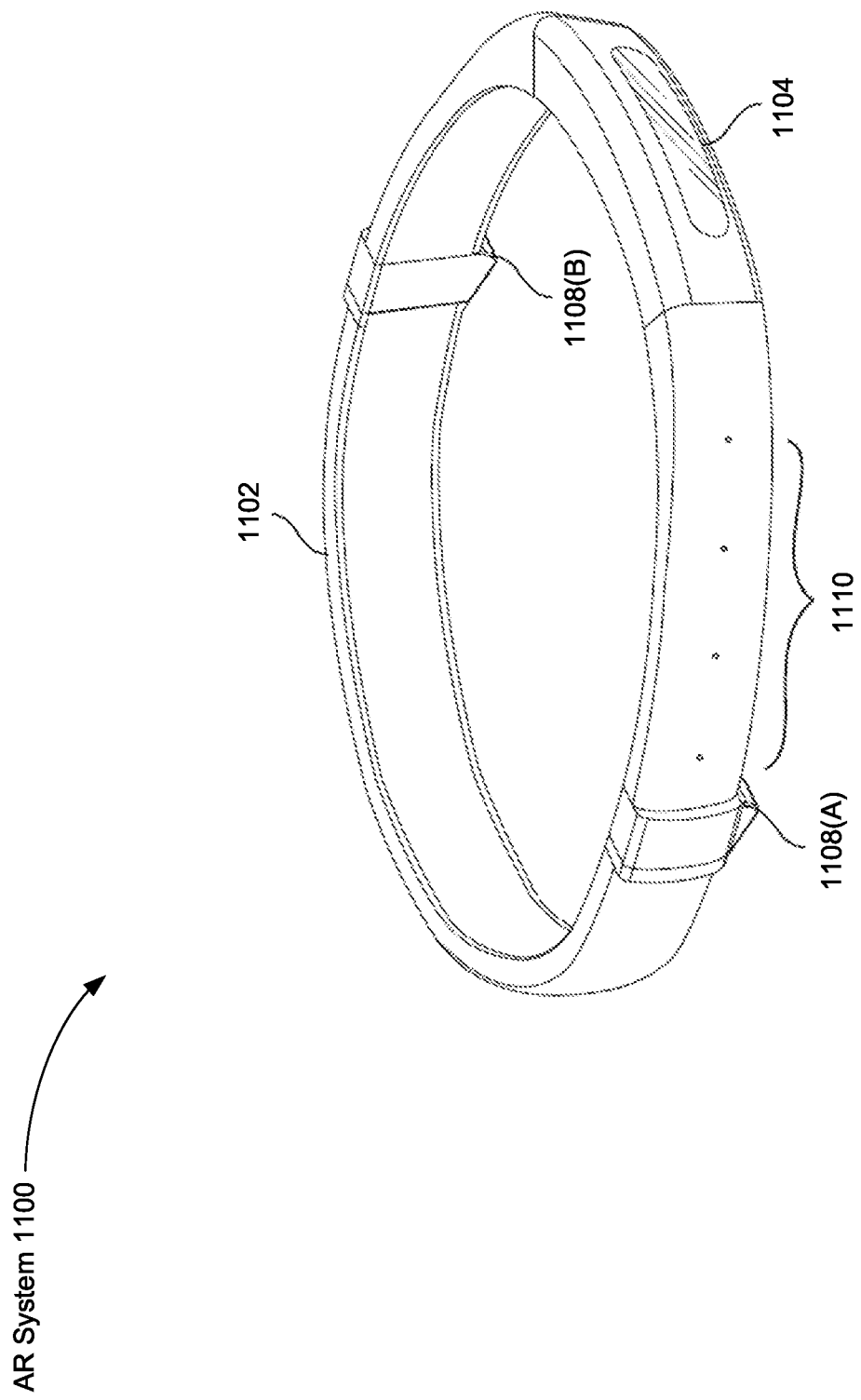
FIG. 11 illustrates an embodiment of an artificial reality device.

In some embodiments, the computer system 130 is a standalone device that is coupled to a head-mounted display 140. For example, the computer system 130 has processor(s)/core(s) 132 for controlling one or more functions of the computer system 130 and the head-mounted display 140 has processor(s)/core(s) 141 for controlling one or more functions of the head-mounted display 140. Alternatively, in some embodiments, the head-mounted display 140 is a component of computer system 130. For example, the processor(s) 132 controls functions of the computer system 130 and the head-mounted display 140. In addition, in some embodiments, the head-mounted display 140 includes the processor(s) 141 that communicate with the processor(s) 132 of the computer system 130. In some embodiments, communications between the computer system 130 and the head-mounted display 140 occur via a wired (or wireless) connection between communications bus 138 and communications bus 146. In some embodiments, the computer system 130 and the head-mounted display 140 share a single communications bus. It is noted that in some instances the head-mounted display 140 is separate from the computer system 130 (as shown in FIG. 11).

The computer system 130 may be any suitable computer device, such as a laptop computer, a tablet device, a netbook, a personal digital assistant, a mobile phone, a smart phone, a virtual reality device (e.g., a virtual reality (VR) device, an augmented reality (AR) device, or the like), a gaming device, a computer server, or any other computing device. The computer system 130 is sometimes called a host or a host system. In some embodiments, the computer system 130 includes other user interface components such as a keyboard, a touch-screen display, a mouse, a track-pad, and/or any number of supplemental I/O devices to add functionality to computer system 130.

In some embodiments, one or more cameras 139 of the computer system 130 are used to facilitate virtual reality and/or augmented reality. Moreover, in some embodiments, the one or more cameras 139 also act as projectors to display the virtual and/or augmented images (or in some embodiments the computer system includes one or more distinct projectors). In some embodiments, the computer system 130 provides images captured by the one or more cameras 139 to the display 144 of the head-mounted display 140, and the display 144 in turn displays the provided images. In some embodiments, the processors 141 of the head-mounted display 140 process the provided images. It is noted that in some embodiments, one or more of the cameras 139 are part of the head-mounted display 140.

Figure 12:
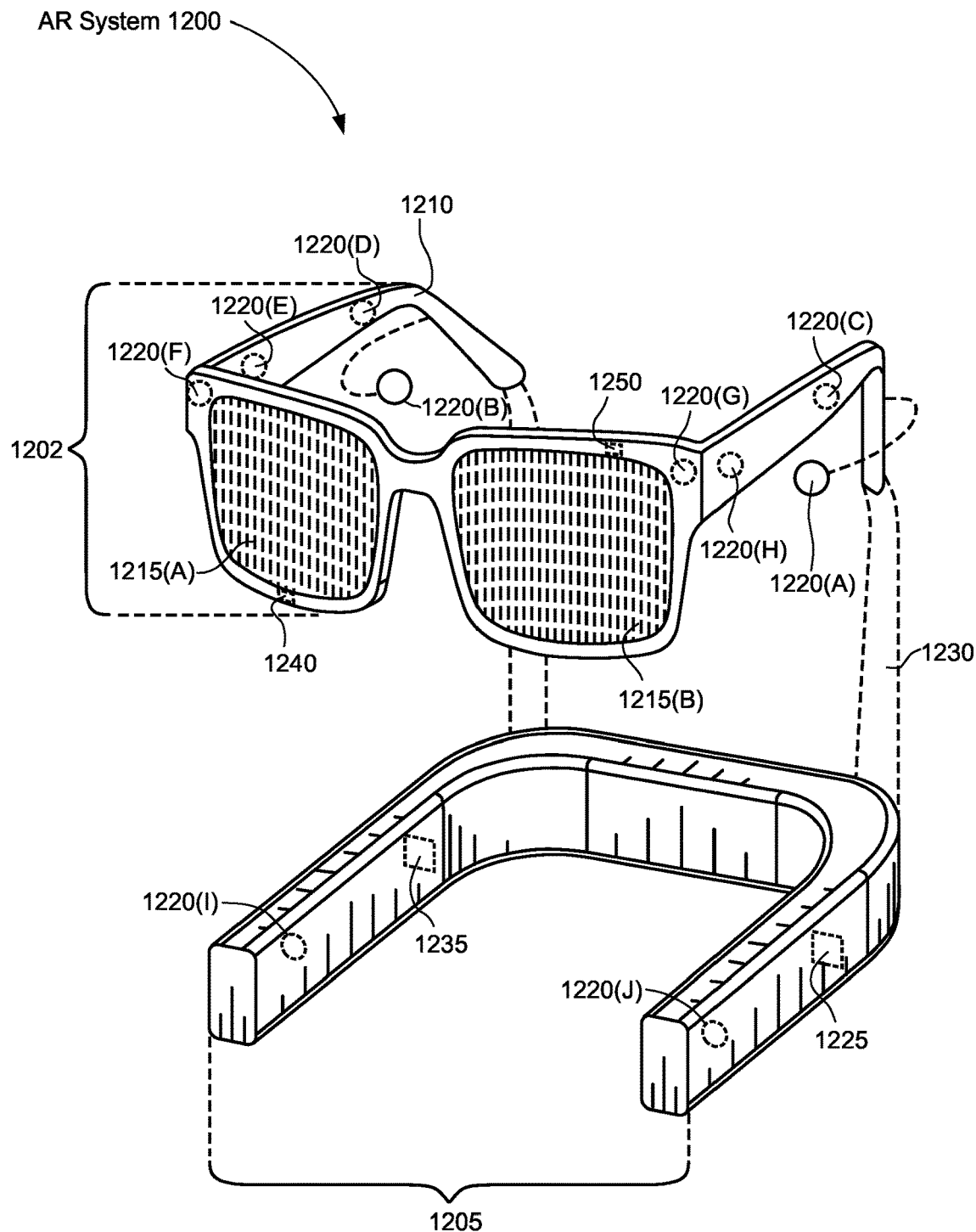
FIG. 12 illustrates an embodiment of an augmented reality headset and a corresponding neckband.
Figure 13:
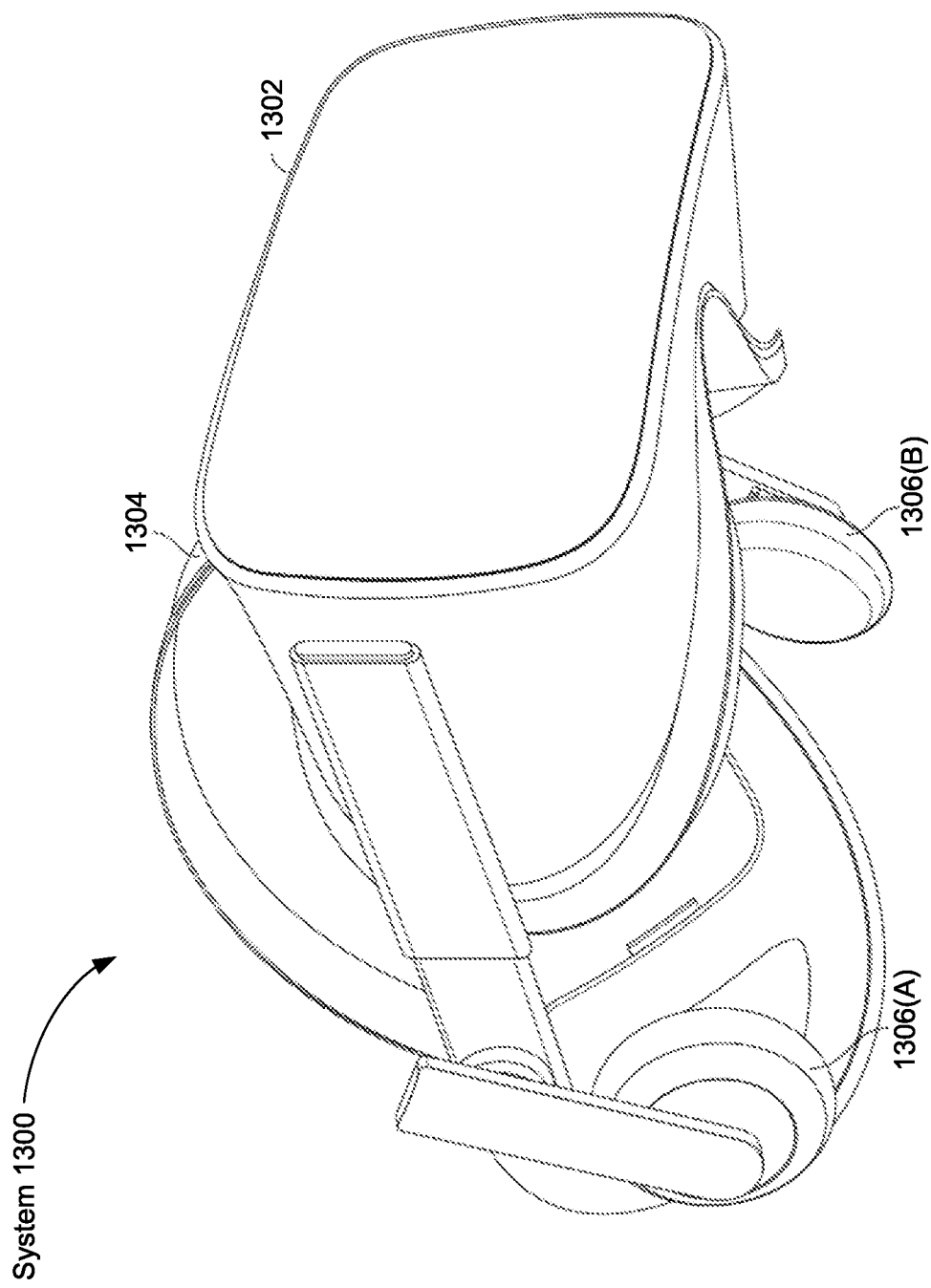
FIG. 13 illustrates an embodiment of a virtual reality headset.

The head-mounted display 140 presents media to a user. Examples of media presented by the head-mounted display 140 include images, video, audio, or some combination thereof. In some embodiments, audio is presented via an external device (e.g., speakers and/or headphones) that receives audio information from the head-mounted display 140, the computer system 130, or both, and presents audio data based on the audio information. The displayed images may be in virtual reality, augmented reality, or mixed reality. An exemplary head-mounted display 140, for example, includes one or more processor(s)/core(s) 141, a memory 142, and/or one or more displays 144. In some embodiments, these components are interconnected by way of a communications bus 146. References to these components of the head-mounted display 140 cover embodiments in which one or more of these components (and combinations thereof) are included. It is noted that in some embodiments, the head-mounted display 140 includes one or more sensors 145. Alternatively, in some embodiments, the one or more sensors 145 are part of the computer system 130. FIGS. 12 and 13 illustrate additional examples (e.g., AR system 1200 and VR system 1300) of the head-mounted display 140.

The electronic display 144 displays images to the user in accordance with data received from the computer system 130. In various embodiments, the electronic display 144 may comprise a single electronic display or multiple electronic displays (e.g., one display for each eye of a user).

The sensors 145 include one or more hardware devices that detect spatial and motion information about the head-mounted display 140. Spatial and motion information can include information about the position, orientation, velocity, rotation, and acceleration of the head-mounted display 140.

For example, the sensors 145 may include one or more inertial measurement units (IMUs) that detect rotation of the user's head while the user is wearing the head-mounted display 140. This rotation information can then be used (e.g., by the computer system 130) to adjust the images displayed on the electronic display 144. In some embodiments, each IMU includes one or more gyroscopes, accelerometers, and/or magnetometers to collect the spatial and motion information. In some embodiments, the sensors 145 include one or more cameras positioned on the head-mounted display 140.

In some embodiments, the transducer array 110 of the wearable device 102 may include one or more transducers configured to generate and/or receive signals. Integrated circuits (not shown) of the wearable device 102, such as a controller circuit and/or signal generator (e.g., waveform generator), may control the behavior of the transducers (e.g., controller 412, FIG. 4A).

The communications component 112 of the wearable device 102 may include a communications component antenna for communicating with the computer system 130. Moreover, the communications component 136 may include a complementary communications component antenna that communicates with the communications component 112. The respective communication components are discussed in further detail below with reference to FIGS. 2 and 3.

In some embodiments, data contained within communication signals is used by the wearable device 102 for selecting and/or generating projection images. In some embodiments, the data contained within the communication signals alerts the computer system 130 that the wearable device 102 is ready for use. As will be described in more detail below, the computer system 130 sends instructions to the wearable device 102, and in response to receiving the instructions, the wearable device generates projection images 602 that are displayed on an appendage of the user of the wearable device 102. Alternatively or in addition, in some embodiments, the wearable device 102 sends signals to the computer device 130 that include information indicating a location of a touch on the user's body (or a position of an appendage with respect to a position of the wearable device). As explained above, a wearable device receiving signals transmitted by another wearable device is able to determine, based on changes of signal parameters caused by the touch, a location of the touch on the wearer's body. As one example, a keyboard (or some other user interface) may be projected or perceived to be projected onto the user's forearm, and the wearable device may determine, based on changes of signal parameters caused by the touch, that the user is intending to interact with a first affordance of the keyboard. In this way, the system 100 provides a novel way of determining where (and/or whether) a person contacts his or her skin (e.g., in combination with or separate from other video-based means for making this determination). This is particularly useful when augmented reality is being used, and actual images are not in fact projected onto the user's body. In another example, the wearable device may determine, based on changes of signal parameters, that the user touched her forearm. Information related to the touch may then be sent to the computer device 130, and used by the computer device 130 to confirm that a touch occurred on the forearm.

Non-limiting examples of sensors 114 and/or sensors 145 include, e.g., infrared, pyroelectric, ultrasonic, microphone, laser, optical, Doppler, gyro, accelerometer, resonant LC sensors, capacitive sensors, acoustic sensors, and/or inductive sensors. In some embodiments, sensors 114 and/or sensors 145 are configured to gather data that is used to determine a hand posture of a user of the wearable device and/or an impedance of the medium. Examples of sensor data output by these sensors include: body temperature data, infrared range-finder data, motion data, activity recognition data, silhouette detection and recognition data, gesture data, heart rate data, and other wearable device data (e.g., biometric readings and output, accelerometer data). In some embodiments, the transducers themselves serve as sensors.

Figure 1B:
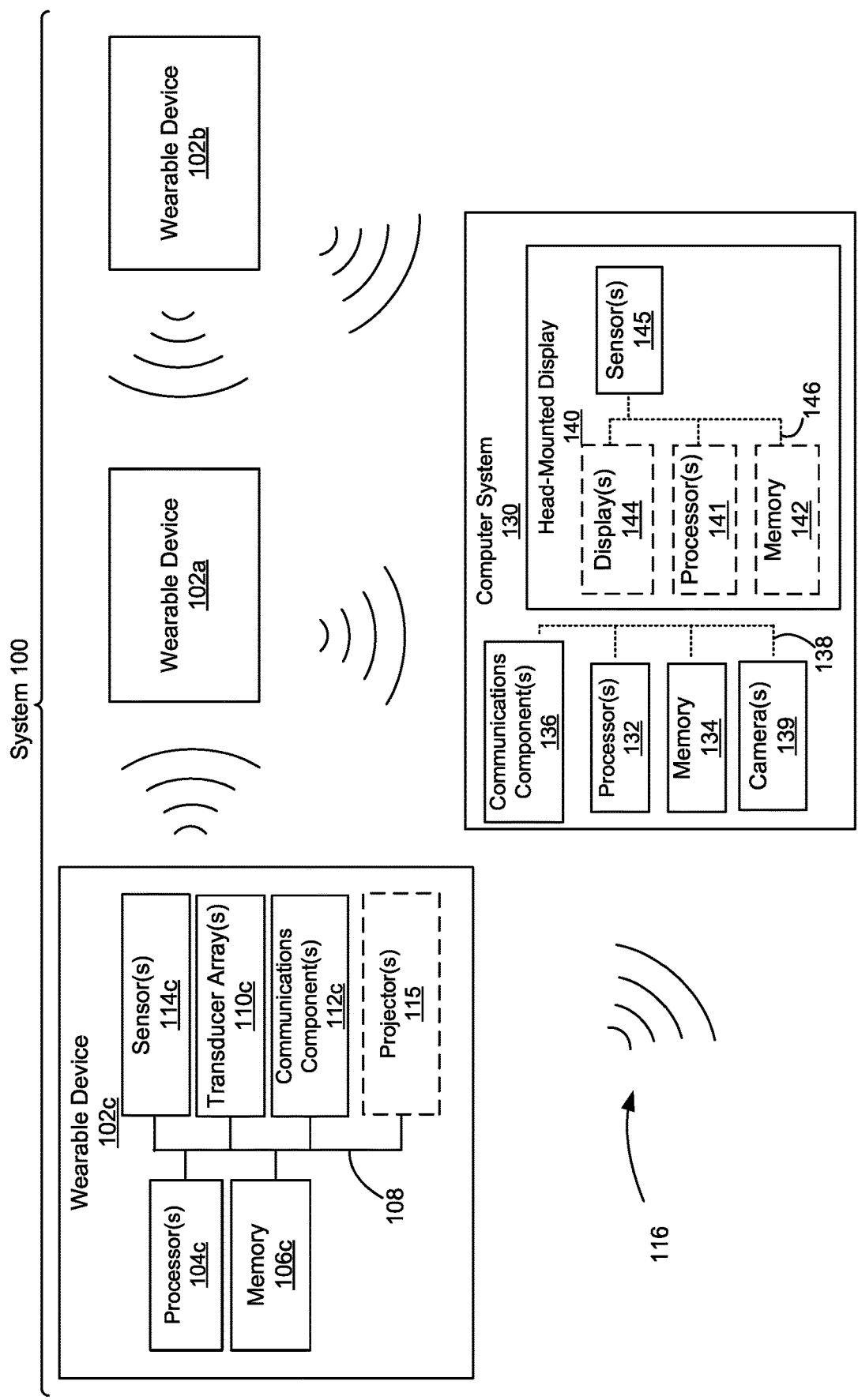
FIG. 1B is a block diagram illustrating an exemplary projection system, in accordance with various embodiments.

FIG. 1B is a block diagram illustrating an embodiment of the system 100, in accordance with various embodiments. The system 100 includes wearable devices 102a, 102b, and 102c which are used in conjunction with a computer system 130 (e.g., a host system or a host computer). Wearable device 102c may be an additional device worn by the user to be used in conjunction with wearable devices 102a and 102b. For example, the wearable device 102c may be a ring which may be used to determine a location of a touch gesture. In another example, the wearable device 102a and wearable device 102c may be distinct wristbands to be worn on each wrist of the user. In some embodiments, the system 100 provides the functionality of a virtual-reality device with image projection, an augmented reality device with image projection, a combination thereof, or provides some other functionality. In some embodiments, the wearable device 102c may include all or some of the features embodied in the wearable devices 102a, 102b.

Figure 2:
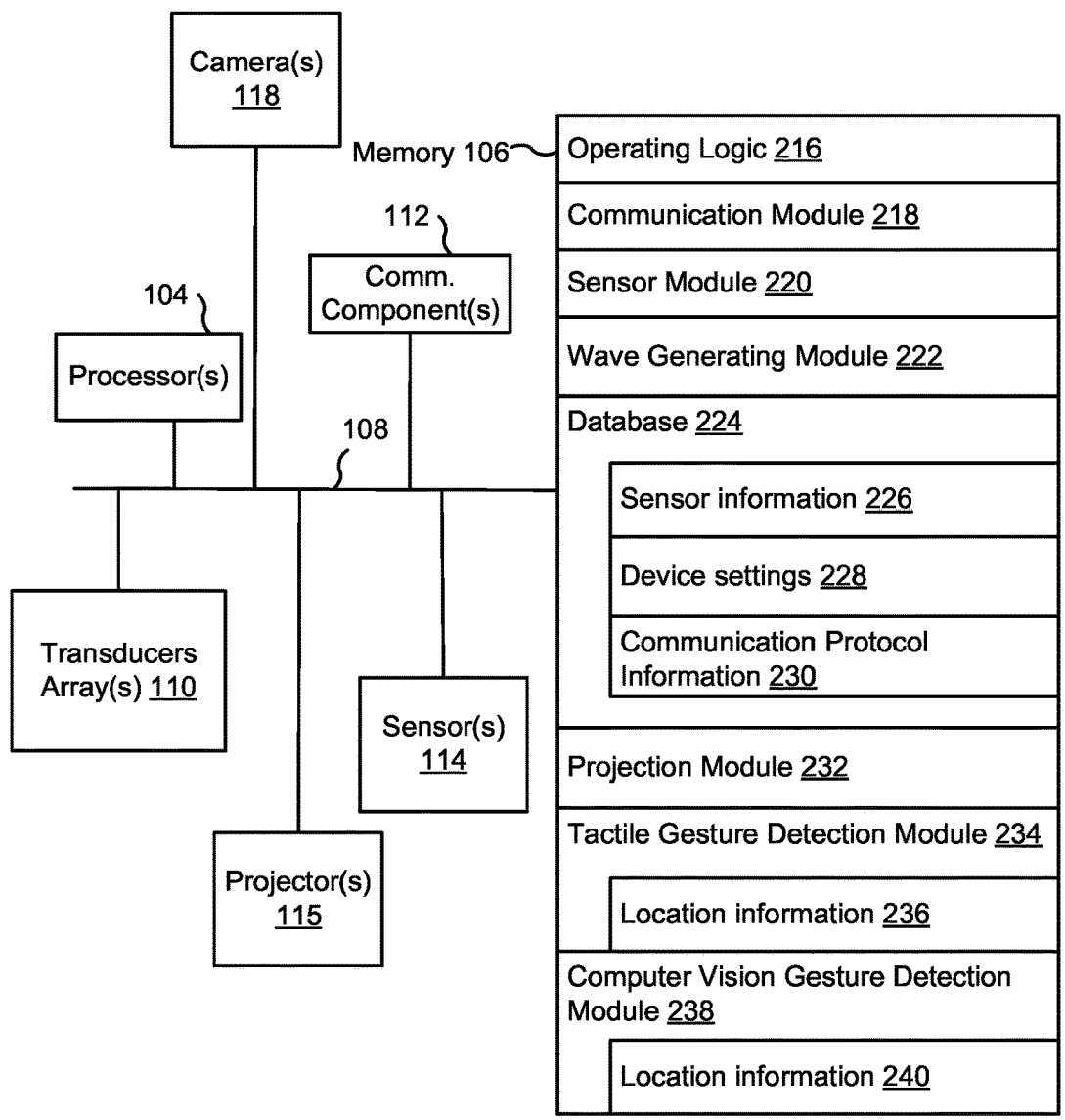
FIG. 2 is a block diagram illustrating an exemplary wearable device in accordance with some embodiments.

FIG. 2 is a block diagram illustrating a representative wearable device 102 in accordance with some embodiments. In some embodiments, the wearable device 102 includes one or more processing units (e.g., CPUs, microprocessors, and the like) 104, one or more communication components 112, memory 106, one or more transducer arrays 110, one or more projectors 115, one or more cameras 118, and one or more communication buses 108 for interconnecting these components (sometimes called a chipset). In some embodiments, the wearable device 102 includes one or more sensors 114 as described above with reference to FIG. 1. In some embodiments (not shown), the wearable device 102 includes one or more output devices such as one or more indicator lights, sound cards, speakers, displays for displaying textual information and error codes, etc.

Transducers in a respective transducer array 110 generate signals 116 (FIG. 1). In some embodiments, the transducers may include, e.g., hardware capable of generating the signals 116 (e.g., electromagnetic waves, soundwaves, ultrasound waves, etc.). For example, each transducer can convert electrical signals into ultrasound waves. The transducers may be miniature piezoelectric transducers, capacitive transducers, single or multipole voice coil motors, and/or any other suitable device for creation of signals. Additionally, in some embodiments, the transducers can also receive signals (e.g., if the transducer can generate sound waves, it can also receive sound waves). Continuing, in some embodiments, the transducers may also be any of the sensors 114 described above with reference to FIG. 1. In some embodiments, a first wearable device 102a includes first transducers (e.g., transducers for receiving, sensing, detecting, etc.) while a second wearable 102b includes second transducers (e.g., transducers for generates signals to be sensed by the first transducers) distinct from the first transducers.

The communication component(s) 112 enable communication between the wearable device 102 and one or more communication networks. In some embodiments, the communication component(s) 112 include, e.g., hardware capable of data communications using any of a variety of wireless protocols (e.g., IEEE 802.15.4, Wi-Fi, ZigBee, 6LoWPAN, Thread, Z-Wave, Bluetooth Smart, ISA100.11a, WirelessHART, MiWi, etc.), wired protocols (e.g., Ethernet, HomePlug, etc.), and/or any other suitable communication protocol, including communication protocols not yet developed as of the filing date of this document.

The memory 106 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 106, or alternatively the non-volatile memory within memory 106, includes a non-transitory computer-readable storage medium. In some embodiments, the memory 106, or the non-transitory computer-readable storage medium of the memory 106, stores the following programs, modules, and data structures, or a subset or superset thereof:

- operating logic 216 including procedures for handling various basic system services and for performing hardware dependent tasks;
- communication module 218 for coupling to and/or communicating with remote devices (e.g., computer system 130, other wearable devices, etc.) in conjunction with communication component(s) 112;
- sensor module 220 for obtaining and processing sensor data (e.g., in conjunction with sensor(s) 114 and/or transducer arrays 110) to, for example, determine an orientation of the wearable device 102 and sensing signals generated by one or more transducers (among other purposes such as determining hand pose of the user of the wearable device);
- signal generating module 222 for generating and transmitting (e.g., in conjunction with transducers(s) 110) signals. In some embodiments, the module 222 also includes or is associated with a data generation module 223 that is used to generate data corresponding to the received portion of the transmitted signals (e.g., data for a candidate touch event);
- database 224, including but not limited to:
  - sensor information 226 for storing and managing data received, detected, and/or transmitted by one or more sensors (e.g., sensors 114, one or more remote sensors, and/or transducer arrays 110);
  - device settings 228 for storing operational settings for the wearable device 102 and/or one or more remote devices (e.g., selected characteristics/parameters values for the signals); and
  - communication protocol information 230 for storing and managing protocol information for one or more protocols (e.g., custom or standard wireless protocols, such as ZigBee, Z-Wave, etc., and/or custom or standard wired protocols, such as Ethernet);
- projection module 232 for projecting one or more images onto an appendage of the wearer or user of the wearable device;
- tactile gesture detection module 234 for detecting a touch gesture on the one or more projected images projected via projector 115, including but not limited to:
  - tactile location information 236 for detecting a location of the touch gesture on the one or more projected images; and
- computer vision gesture detection module for detecting a touch gesture on the one or more projected images detected via camera 118, including but not limited to:
  - computer vision location information 240 for detecting a location of the touch gesture on the one or more projected images using computer vision analysis.

In some embodiments, the tactile gesture detection module 234 uses a known impedance map of the user's body, capacitive coupling technologies, signal processing techniques, and/or acoustic wave coupling (e.g., ultrasound waves) when determining a location of the touch gesture. In some embodiments, the tactile gesture detection module 234 communicates with the sensor module 220 to determine a location of the touch gesture on the user's body (e.g., based on the sensor data obtained by the sensor module 220, the tactile gesture detection module 234 can determine a location of the touch gesture). In some embodiments, the tactile gesture detection module 234 and/or the computer vision gesture detection module 238 is (are) located at the computer system 130.

In some embodiments, the location information 236, 240 is determined using computer vision technologies and/or non-optical imaging techniques using capacitance, magnetism, and millimeter wave technologies and/or acoustic wave coupling (e.g., ultrasound waves).

In some embodiments (not shown), the wearable device 102 includes a location detection device, such as a GNSS (e.g., GPS, GLONASS, etc.) or other geo-location receiver, for determining the location of the wearable device 102. Further, in some embodiments, the wearable device 102 includes location detection module (e.g., a GPS, Wi-Fi, magnetic, or hybrid positioning module) for determining the location of the wearable device 102 (e.g., using the location detection device) and providing this location information to the host system 130.

In some embodiments (not shown), the wearable device 102 includes a unique identifier stored in database 224. In some embodiments, the wearable device 102 sends the unique identifier to the host system 130 to identify itself to the host system 130. This is particularly useful when multiple wearable devices are being concurrently used.

Each of the above-identified elements (e.g., modules stored in memory 106 of the wearable device 102) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 106, optionally, stores a subset of the modules and data structures identified above. Furthermore, the memory 106, optionally, stores additional modules and data structures not described above.

Figure 3:
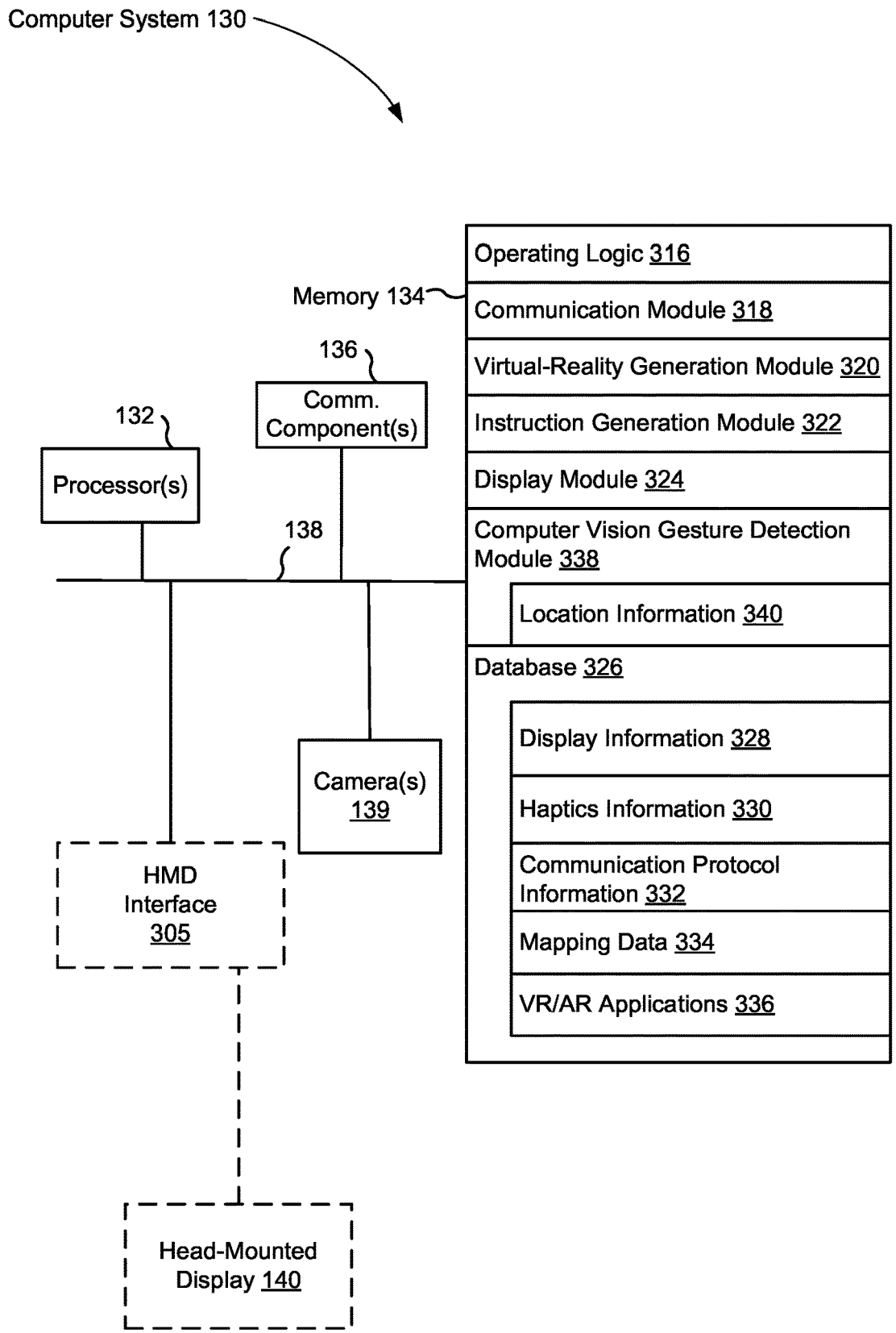
FIG. 3 is a block diagram illustrating an exemplary computer system in accordance with some embodiments.

FIG. 3 is a block diagram illustrating a representative computer system 130 in accordance with some embodiments. In some embodiments, the computer system 130 includes one or more processing units/cores (e.g., CPUs, GPUs, microprocessors, and the like) 132, one or more communication components 136, memory 134, one or more cameras 139, and one or more communication buses 308 for interconnecting these components (sometimes called a chipset). In some embodiments, the computer system 130 includes a head-mounted display interface 305 for connecting the computer system 130 with the head-mounted display 140. As discussed above in FIG. 1, in some embodiments, the computer system 130 and the head-mounted display 140 are together in a single device, whereas in other embodiments the computer system 130 and the head-mounted display 140 are separate from one another.

Although not shown, in some embodiments, the computer system (and/or the head-mounted display 140) includes one or more sensors 145 (as discussed above with reference to FIG. 1) and/or one or more instances of the transducer arrays 110.

The communication component(s) 136 enable communication between the computer system 130 and one or more communication networks. In some embodiments, the communication component(s) 136 include, e.g., hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.), custom or standard wired protocols (e.g., Ethernet, HomePlug, etc.), and/or any other suitable communication protocol, including communication protocols not yet developed as of the filing date of this document.

The memory 134 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 134, or alternatively the non-volatile memory within memory 134, includes a non-transitory computer-readable storage medium. In some embodiments, the memory 134, or the non-transitory computer-readable storage medium of the memory 134, stores the following programs, modules, and data structures, or a subset or superset thereof:

- operating logic 316 including procedures for handling various basic system services and for performing hardware dependent tasks;
- communication module 318 for coupling to and/or communicating with remote devices (e.g., wearable devices 102a-102-n, a remote server (not shown), etc.) in conjunction with communication component(s) 136;
- virtual-reality generation module 320 that is used for generating virtual-reality images and sending corresponding video and audio data to the HMD 140 (in some embodiments, the virtual-reality generation module 320 is an augmented-reality generation module 320 (or the memory 134 includes a distinct augmented-reality generation module) that is used for generating augmented-reality images and projecting those images in conjunction with the camera(s) 139 and the HMD 140);
- instruction module 322 that is used for generating an instruction that, when sent to the wearable device 102 (e.g., using the communications component 136), causes the wearable device 102 to activate two or more transducers;
- display module 324 that is used for displaying virtual-reality images and/or augmented-reality images in conjunction with the head-mounted display 140 and/or the camera(s) 139;
- computer vision gesture detection module 338 for detecting a touch gesture detected via camera 139, including but not limited to:
  - computer vision location information 340 for detecting a location of the touch gesture using computer vision analysis.
- database 326, including but not limited to:
  - display information 328 for storing (and generating) virtual-reality images and/or augmented-reality images (e.g., visual data);
  - haptics information 330 for storing (and generating) haptics information that corresponds to displayed virtual-reality images and environments and/or augmented-reality images and environments;
  - communication protocol information 332 for storing and managing protocol information for one or more protocols (e.g., custom or standard wireless protocols, such as ZigBee, Z-Wave, etc., and/or custom or standard wired protocols, such as Ethernet); and
  - mapping data 334 for storing and managing mapping data (e.g., mapping one or more wearable devices 102 on a user).

In the example shown in FIG. 3, the computer system 130 further includes virtual-reality (and/or augmented-reality) applications 336. In some embodiments, the virtual-reality applications 336 are implemented as software modules that are stored on the storage device and executed by the processor. Each virtual-reality application 336 is a group of instructions that, when executed by a processor, generates virtual or augmented reality content for presentation to the user. A virtual-reality application 336 may generate virtual/augmented-reality content in response to inputs received from the user via movement of the head-mounted display 140 or the wearable device 102. Examples of virtual-reality applications 336 include gaming applications, conferencing applications, and video playback applications.

The virtual-reality generation module 320 is a software module that allows virtual-reality applications 336 to operate in conjunction with the head-mounted display 140 and the wearable device 102. The virtual-reality generation module 320 may receive information from the sensors 145 on the head-mounted display 140 and may, in turn provide the information to a virtual-reality application 336. Based on the received information, the virtual-reality generation module 320 determines media content to provide to the head-mounted display 140 for presentation to the user via the electronic display 144. For example, if the virtual-reality generation module 320 receives information from the sensors 145 on the head-mounted display 140 indicating that the user has looked to the left, the virtual-reality generation module 320 generates content for the head-mounted display 140 that mirrors the user's movement in a virtual/augmented environment. An example VR system 1300 is provided in FIG. 13.

Similarly, in some embodiments, the virtual-reality generation module 320 receives information from the sensors 114 on the wearable device 102 and provides the information to a virtual-reality application 336. The application 336 can use the information to perform an action within the virtual/augmented world of the application 336. For example, if the virtual-reality generation module 320 receives information from the sensors 114 that the user has raised his hand, a simulated hand (e.g., the user's avatar) in the virtual-reality application 336 lifts to a corresponding height. As noted above, the information received by the virtual-reality generation module 320 can also include information from the head-mounted display 140. For example, cameras 139 on the head-mounted display 140 may capture movements of the user (e.g., movement of the user's arm), and the application 336 can use this additional information to perform the action within the virtual/augmented world of the application 336.

To further illustrate with an augmented reality example, if the augment-reality generation module 320 receives information from the sensors 114 that the user has rotated his forearm while, in augmented reality, a user interface (e.g., a keypad) is displayed on the user's forearm, the augmented-reality generation module 320 generates content for the head-mounted display 140 that mirrors the user's movement in the augmented environment (e.g., the user interface rotates in accordance with the rotation of the user's forearm). An example AR system 1200 is provided in FIG. 12.

In some embodiments, the computer system 130 receives sensor data from the wearable device 102 and the computer system 130 includes a module to determine a touch location associated with the sensor data. In some embodiments, the computer system 130 determines a touch location (e.g., using the computer vision gesture detection module 338) based on sensor data from the wearable device 102 and image data captured by the one or more camera 139. In this way, a majority of the processing is offloaded from the wearable device 102 to the computer system 130, which may have increased processing abilities.

Each of the above identified elements (e.g., modules stored in memory 134 of the computer system 130) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 134, optionally, stores a subset of the modules and data structures identified above.

FIG. 4A is an example view of the wearable device 102 in accordance with some embodiments. The example view shows the user's hand 408, user's wrist 404, user's arm 406, and the wearable device 102 on the user's arm 406. Such an arrangement is merely one possible arrangement, and one skilled in the art will appreciate that the discussion herein is not limited to the arrangement shown in FIG. 4A. Additionally, the wearable device 102 shown in FIG. 4A is shown oversized for ease of illustration. In practice, a size of the wearable device 102 can be reduced, if desired, so that the wearable device 102 has a size similar to a smart watch or fitness tracker.

Figure 5:
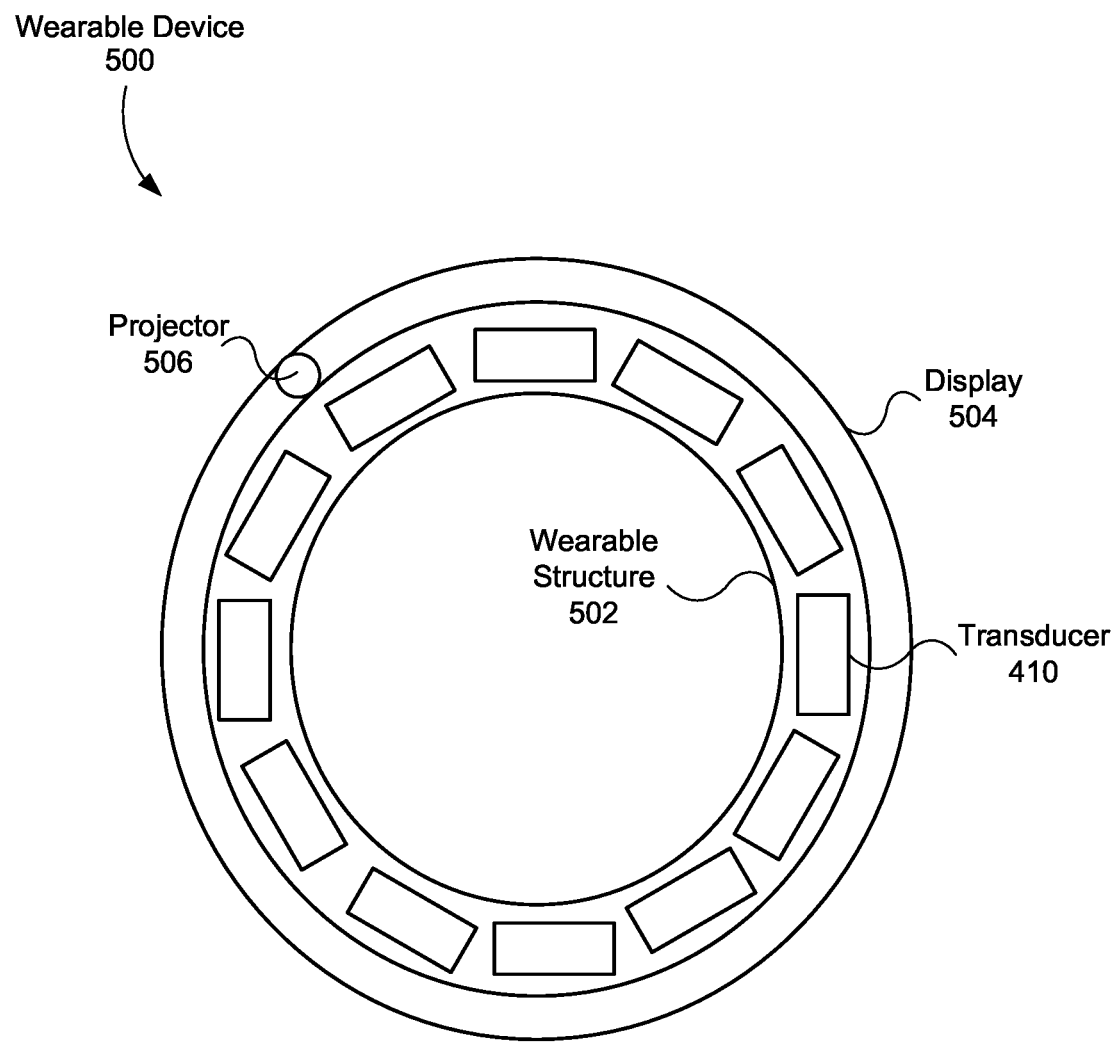
FIG. 5 is an exemplary cross-sectional view of a wearable device in accordance with some embodiments.

The wearable device 102 includes a wearable structure 402 that may be a flexible mechanical substrate such as a plastic (e.g., polyethylene or polypropylene), rubber, nylon, synthetic, polymer, etc. In some embodiments, the wearable structure 402 is configured to be worn around at least a portion of a user's wrist or arm 404/406 (and various other body parts). The wearable device 102 includes a transducer array 110, including a plurality of transducers 410 arranged at different locations on the wearable structure 402. The transducers 410 can be arranged in a pattern along an inner surface of the wearable structure 402 facing the arm 406 such that the transducers 410 contact the user's skin. In another example, the transducers can be arranged in a radial pattern along an inner perimeter of the wearable structure 502 (FIG. 5).

In some embodiments, a respective transducer 410 is configured to generate signals (e.g., waves 116, FIG. 1) in response to receiving one or more control signals from a controller (not shown). The one or more control signals instruct one or more transducers 410 in the transducer array 110 to send signals (e.g., ultrasonic waves) into/through the user's body (e.g., wrist or arm). The signals transmitted by the one or more transducers 410 are to travel (e.g., propagate, radiate) away from the wearable structure 402 through the user's body. For example, the signals may travel from the user's arm 406, through the user's wrist 404, to the user's hand 408 and fingers. In addition, the signals may travel up the user's arm and eventually travel throughout the user's body.

In some embodiments, the wearable structure 402 includes a projection unit 412 (e.g., projector 115, FIG. 1A) that projects images onto an appendage of a user. In some embodiments, the wearable structure 402 includes a memory (e.g., memory 106, FIG. 1) that stores images to be displayed. For example, the stored images may represent a user interface having keyboard with multiple affordances (various other "touch" interfaces could also be projected onto the user's appendage). In some embodiments, the controller 412 generates a control signal (or multiple signals) based on an instruction from a host system (e.g., computer system 130, FIG. 1). In such embodiments, the wearable device 102 is placed on a user's arm 406 (or various other locations) to project images onto the forearm 406 of the user.

Alternatively, in some embodiments, the wearable device 102 does not project images but instead, through the computer system 130 and the head-mounted display 140, images are perceived on the user's arm (or other body part) through augmented reality. In such embodiments, the wearable device 102 is configured to sense interaction with the user's body. Put another way, the wearable device 102 is used to track a virtual image virtualized by another device (e.g., head-mounted display 140), as if the image were projected onto the user's arm. For example, a camera and/or projector of the other device (e.g., headset, glasses, head-mounted display 140) may project an image onto its own lens (e.g., display 144, FIG. 1). Augmented reality technologies (e.g., AR system 1200, FIG. 12) may implement such an embodiment.

In some embodiments, the other device tracks the user's arm 406 and adjusts the image (e.g., in augmented reality) in accordance with movements of the user's arm 406. For example, cameras 139 may be used to track the user's arm 406.

In some embodiments, the wearable devices 102 are worn in conjunction with one another. In some embodiments, the user may wear a single wearable device.

In some embodiments, the wearable devices 102 may be configured to interact with a computer system (e.g., computer system 130) that does not include a visual output. For example, wearable device 102 may be used to control settings on a phone while the user is on a call and unable to access the screen.

In some embodiments, the transducer array 110 includes transducers 410 designed to make contact with human skin. A contact area having a conductive agent 462 and padding may be used on the wearable device 102 behind each transducer to improve subject comfort and reduce contact impedances (e.g., as shown in FIG. 5). The conductive agent between the transducer and skin may be a "wet" connection using a conductive gel, which may consist of propylene glycol and NaCl, or a "dry" connection, such as a thin layer of conductive polymer (e.g., carbon-doped PDMS).

Figure 4B:
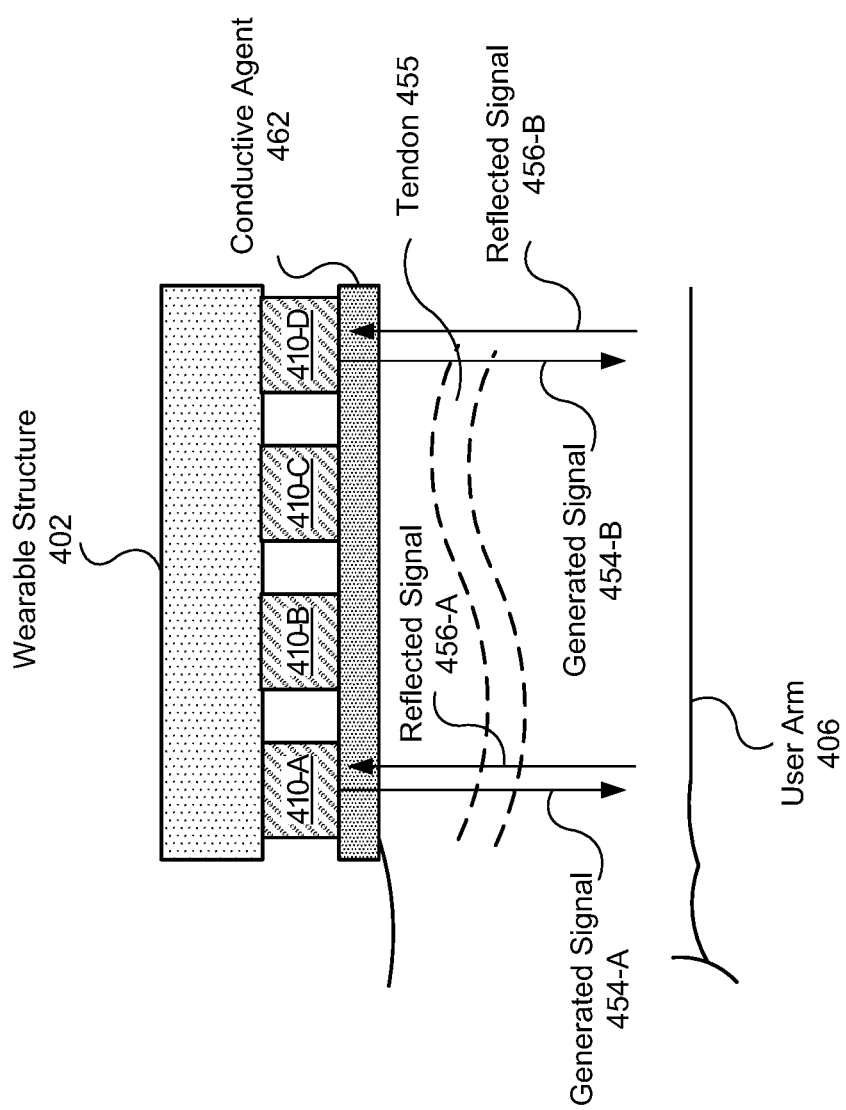
FIG. 4B is an exemplary cross-sectional view of a wearable device on a user's wrist, in accordance with some embodiments.

FIG. 4B is an example cross sectional view of the wearable device 120 taken along the X-Y line shown in FIG. 4A, in accordance with some embodiments. The cross sectional view shows the user's arm 406 and a tendon 455 within the user's arm 406. In this particular example, the transducers 410 do not fully wrap around the wrist (e.g., transducers 410-A-410-D are disposed on one side of the user's arm 406).

One or more of the transducers 410-A-410-D can generate signals (e.g., waves 454-A and 454-B) in the user's arm 406. The generated signals 454-A and 454-B may extend into the user's body (e.g., extend into the epidermis, the dermis, the muscles, the tendons, the ligaments, the bones, etc.). In some embodiments, each transducer 410 varies one or more of a time period of the signal, an amplitude of the signal, and a phase of the signal when generating the signals.

To provide some content, the generated signals 454-A, 454-B, or a portion of the signals 454-A, 454-B, are reflected by the tendon 455 and/or a portion of the wearable structure 402. As a result, the reflected signals 456-A, 456-B are received by the transducers 410-A and 410-D. In some instances, the same transducers that generate the signals do not receive the signals. While not shown in FIG. 4B, one or more signals transmitted by the wearable device 400 may travel through the user's appendage and may be received (e.g., sensed) by a different wearable device attached to the user.

In some embodiments, the transducers 410 transmit signals into the user's body in a staggered manner, where different subsets of the transducers transmit signals at different times. In some embodiments, the remaining transducers may be used to measure the altered signals that they receive. This procedure may then be repeated for multiple stimulation patterns defining an order of transducers (e.g., pairs of transducers) selected to emit the signals.

FIG. 5 is an exemplary cross-sectional view of a wearable device in accordance with some embodiments. The wearable device 500 (e.g., wearable device 102, FIG. 1A, 1B) includes a wearable structure 502. The wearable structure 502 wraps around the part of the user's body. The wearable device 500 further includes a transducer array 110 having a plurality of transducers 410 positioned along an inner perimeter of the wearable structure 502. The transducers 410 in this example are radially spaced, such that the transducers 410 wrap around the wearable structure 502 and form a substantially contiguous circle of transducers. In such an arrangement, the wearable device 500 is able to produce signals 116 in a 360-degree fashion. In some embodiments, the wearable structure 502 separates the transducers 410 from the user's skin. Alternatively, in some embodiments (not shown), the transducers 410 are in direct contact with the user's skin (a conductive agent may also be included). In some embodiments, the wearable structure 502 includes one or more projectors 506 (e.g., projector 115, FIG. 1A-1B).

The wearable device 500 is configured to be attached to a part of a user's body. For example, the wearable device 500 is configured to be attached to a wrist, forearm, ankle, bicep, calf, thigh, scalp, and/or various other parts of the user's body. In some embodiments, the wearable device 500 is a rigid or semi-rigid structure. Alternatively, in some embodiments, the wearable device 500 is a flexible structure. Although the wearable device 500 is shown as a continuous circle, the wearable device 500 may break apart to be attached to the user's body (e.g., in a similar fashion to a watch).

FIG. 6A is an exemplary view of a wearable device on a user's wrist and on the user's head in accordance with some embodiments. In some embodiments, the wearable device 102a is worn on the wrist of the user's arm and the wearable device 102b is worn on the head of the user. In some embodiments, the wearable device 102a uses one or more projectors 115 to project an image 602 onto the arm of the user. In some embodiments, the wearable device 102b includes a camera 118 used for computer vision. In some embodiments, computer vision is used to detect a general position of the wearable device 102a and/or the general position of the user's limb (e.g., hand, arm, fingers). In some embodiments, transducers 410 of the wearable device 102a may determine the magnitude and duration of a touch gesture (e.g., determine whether a user's finger is hovering over the skin, the user's finger is making direct contact with the skin).

In some embodiments, the wearable device 102a does not project images and instead the wearable device 102b is responsible for projecting image 602 (e.g., a user interface) onto the arm of the user. Alternatively, in some embodiments, the wearable device 102b uses augmented reality so that the user perceives the image 602 on his or her arm, but nothing is actually projected. It is noted that the wearable device 102b may be replaced with the computer system 130 (and the head-mounted display 140). Examples of the computer system 130 and the head-mounted display 140 are provided in FIGS. 12 and 13. AR system 1200 (FIG. 12) and VR system 1300 (FIG. 13) can be used to project/display images onto the user or areas around the user.

Figure 6B:
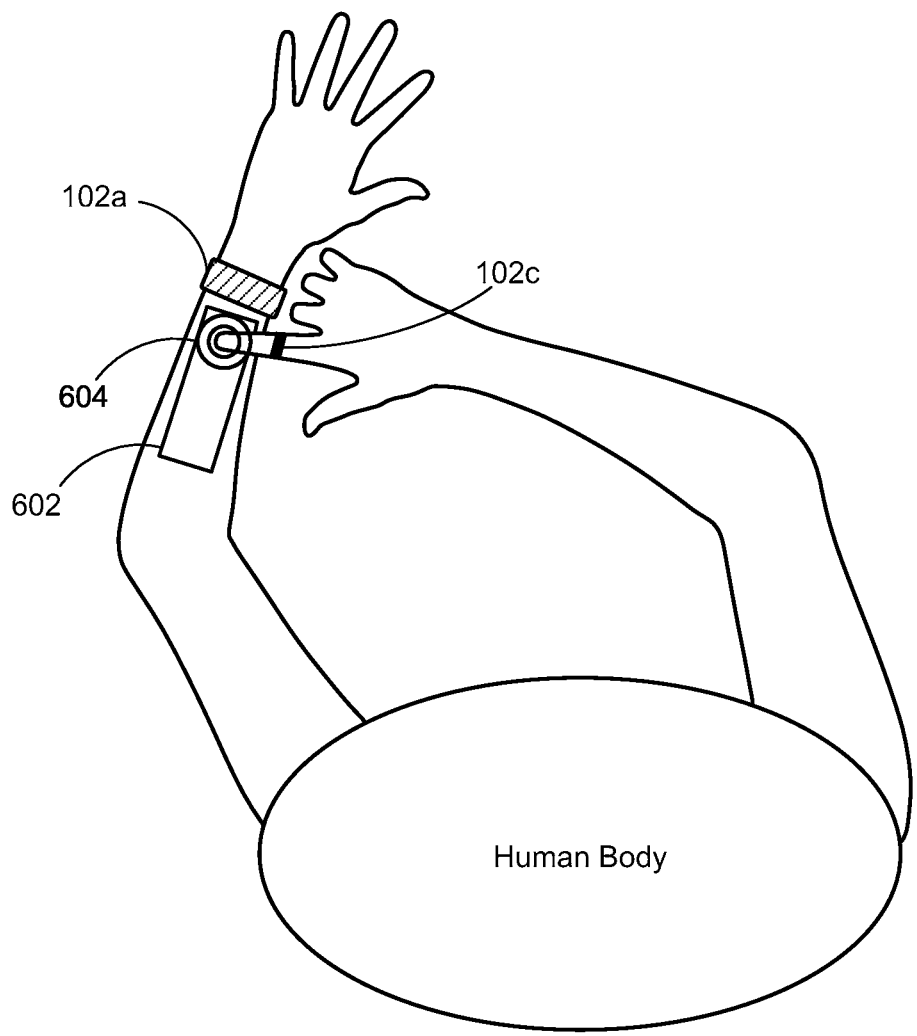
FIG. 6B is an exemplary view of a wearable device on a user's wrist and on the user's finger, in accordance with some embodiments.

FIG. 6B is an exemplary view of wearable devices on a user's wrist and on the user's finger, in accordance with some embodiments. In some embodiments, a first wearable device 102a is worn on the wrist of the user's arm and a second wearable device 102c is worn on a finger on the other arm of the user. In some embodiments, the first wearable device 102a uses one or more projectors 115 to project the image 602 onto the user's arm. Furthermore, the first wearable device 102a may use the one or more projectors 115 or one or more cameras 118 to detect touch gesture with respect to the projected image 602. The touch gesture 804 may be one or more of a tap gesture, a swipe gesture, a pinch gesture, a pull gesture, a twist gesture, etc. on the user's body. In some embodiments, as noted above, the image 602 is not projected onto the use's arm by the wearable device 102a. Instead, the image 602 is perceived in augmented reality. For example, a wearable device (e.g., head-mounted display 140) may display the image 602 onto one or more of the displays 144. Furthermore, the computer system 130 is configured to adjust the display of the image 602 based on detected movement of the user's arm (discussed above with reference to FIG. 3).

Figure 6C:
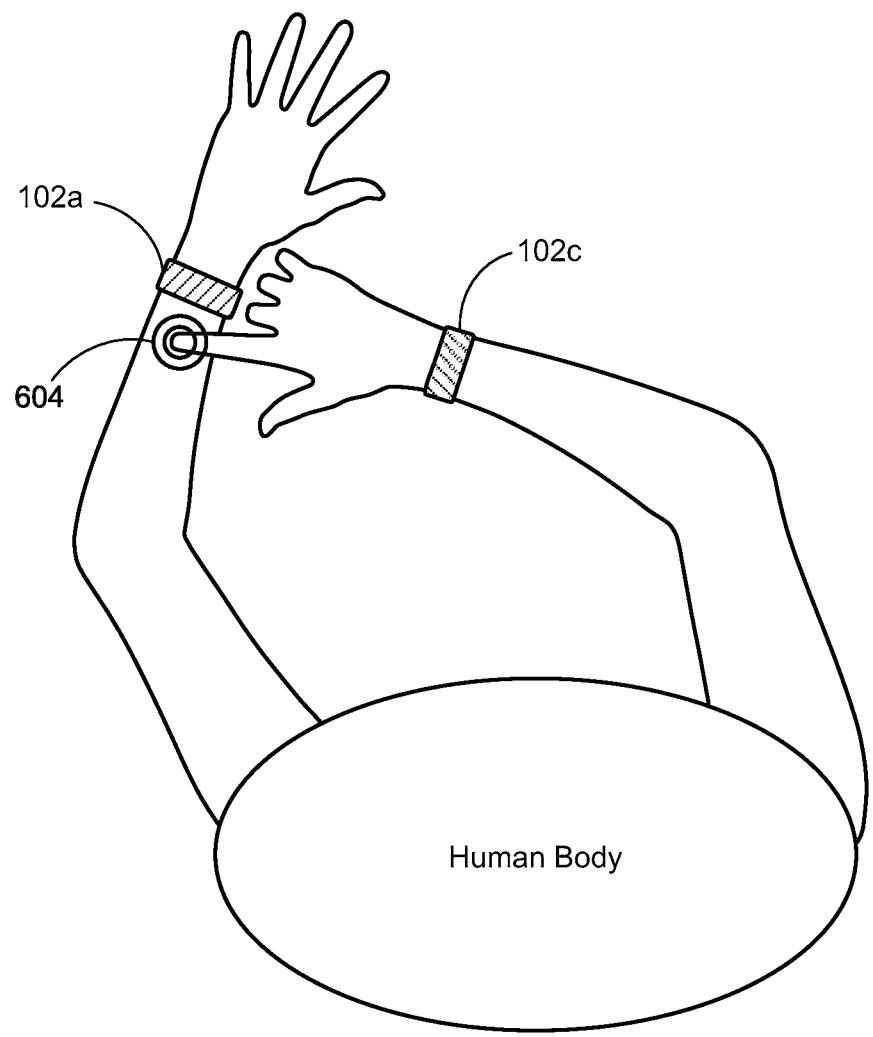
FIG. 6C is an exemplary view of a wearable device on a user's first wrist and on the user's second wrist, in accordance with some embodiments.

FIG. 6C is an exemplary view of wearable devices on a user's first wrist and second wrist, in accordance with some embodiments. The arrangement of wearable devices 102 shown in FIG. 6C is used to detect a touch location 604 on the user's body. In some embodiments, a camera is used to detect the touch location 604. Alternatively or in addition, in some embodiments, detected changes in signal parameters are used to detect the touch location 604 or, more broadly, that a touch occurred.

As shown, a first wearable device 102a is worn on the left wrist of the user's left arm and a second wearable device 102c is worn on the right wrist of the user's right arm. In some embodiments, the first and second wearable devices 102 are identical. For example, the first and second wearable devices 102 include the same arrangement and types of transducers 410. Alternatively, in some embodiments, the first and second wearable devices 102 differ in some way. For example, transducers of the first wearable device 102a may differ from the transducers of the second wearable device 102c. The first wearable device 102a may also include one or more sensors 114 that are not included in the second wearable device 102c. Whether or not the first and second wearable device are identical, in some embodiments, the first wearable device 102a may be configured as a receiver and the second wearable device 102c may be configured as a transmitter (or vice versa).

It is noted that FIG. 6C may represent the user touching his left forearm or FIG. 6C may represent the user hovering his finger above his left forearm. It is also noted that signals generated by the second wearable device 102c, at least in some instances, travel up the user's right arm, across the user's body, and down the user's left arm to be received by the first wearable device 102a. Thus, even if the user is not touching his left forearm, the first wearable device 102a is still able to detect signals generated by the second wearable device 102c. Importantly, by contacting his left forearm (or merely bringing his finger close to the left forearm), the user interferes with the signals traveling across his or her body (e.g., the signals that travel up the right arm and eventually down the left arm). In some instances, the first wearable device 102a is able to detect this interference and determine whether the detected interference satisfies contact criterion. Moreover, a magnitude of the detected interference may correspond to a particular event. For example, a large magnitude difference (i.e., a large interference) indicates that a touch occurred on the left forearm while a smaller magnitude difference (relative to the large magnitude different) (i.e., a small interference) may indicate that a hover event occurred. It is noted that hover events can be detected in a variety other ways as well. For example, in addition to the signals that travel up the user's right arm, across the user's body, and down the user's left arm to be received by the first wearable device 102a, other signals generated by the second wearable device 102b can become capacitively coupled through the air when hand hovering occurs (e.g., right hand hovers above left arm). The capacitive coupling is detectable and can be classified as a "hover." The capacitive coupling reading can have significant noise, which can contribute to the hover classification (e.g., noise is a factor considered when classifying an event as a hover event). Once the touch is made, the strength of the signal increases (e.g., significant jump detected) and can be classified as a "touch." Additionally, the amount of noise decreases.

Figure 6D:
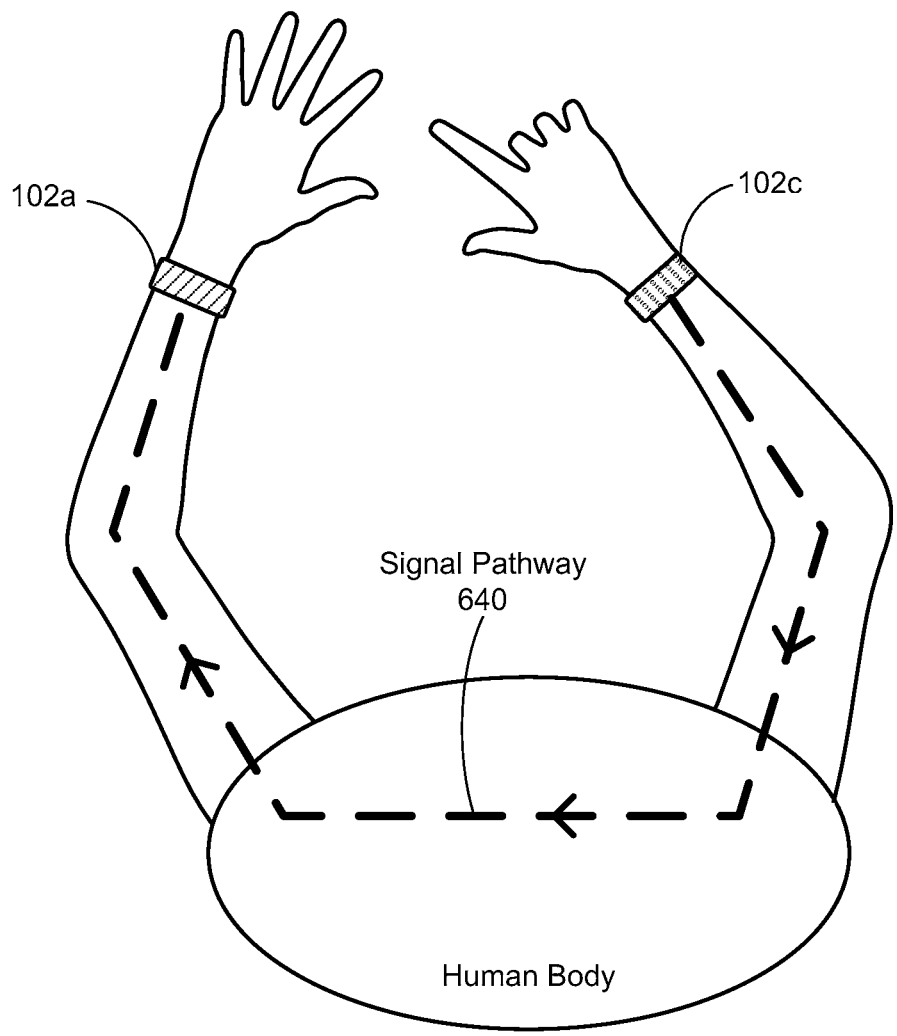
FIG. 6D is an exemplary signal pathway between two wearable devices, in accordance with some embodiments.

FIG. 6D shows one example signal pathway 640 established between two wearable devices. In this example, the second wearable device 102c is transmitting one or more signals that couple into the wrist of the user and propagate (e.g., radiate) throughout the user's body. The first wearable device 102a receives at least some of the one or more signals transmitted by the second wearable device 102c, and in doing so, establishes the signal pathway 640 between the first wearable device 102a and the second wearable device 102c. It is noted that in other embodiments, the first wearable device 102a is the transmitter and the second wearable device 102c is the receiver. In such embodiments, the signal pathway 640 would be reversed (e.g., signals travel from left to right). The signal pathway 640 is discussed in further detail below with reference to FIGS. 9 and 10.

Figure 7:
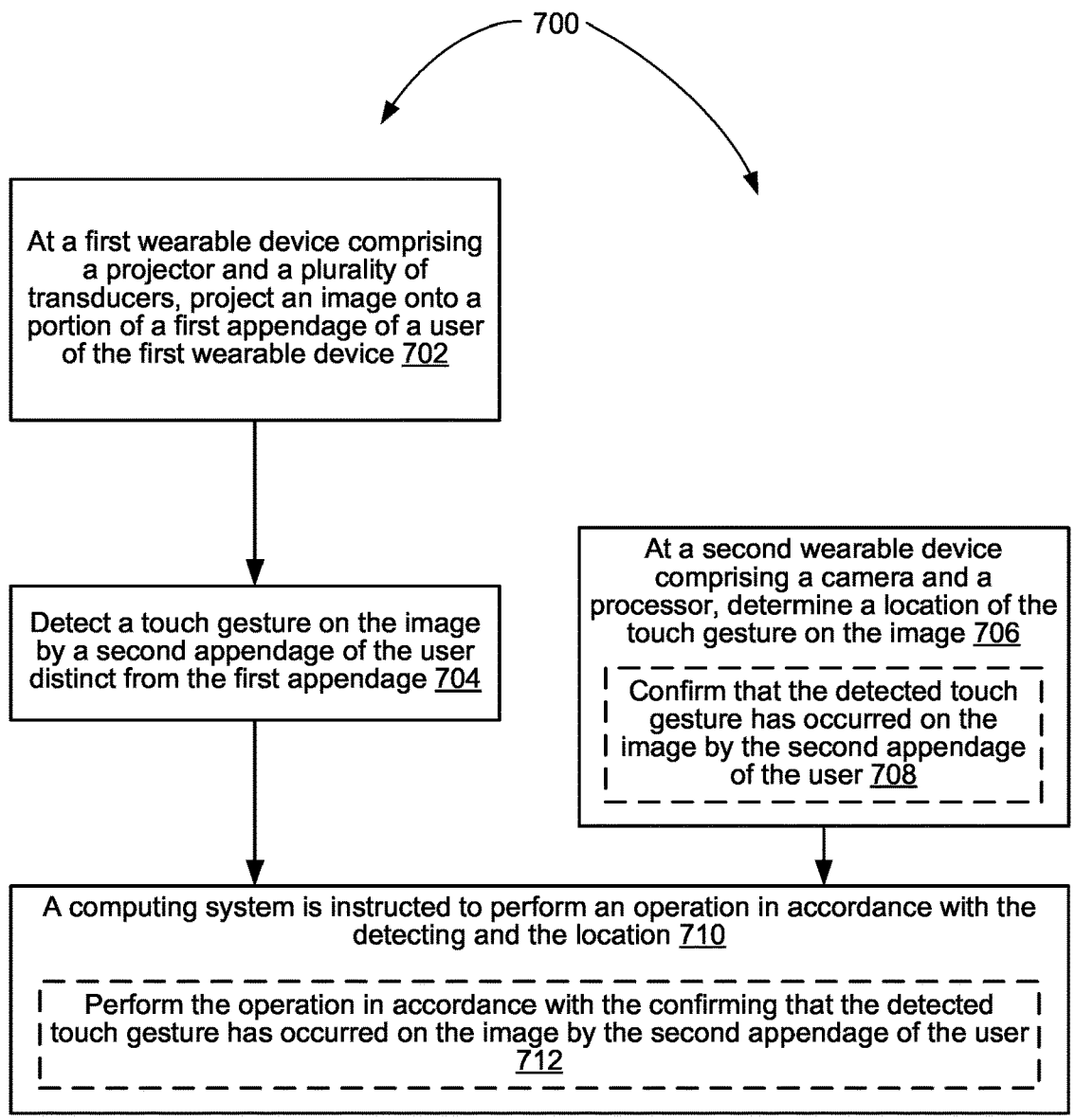
FIG. 7 is a flow diagram illustrating a method of projecting images onto a user's body in accordance with some embodiments.

FIG. 7 is a flow diagram illustrating a method of projecting images onto a user's body in accordance with some embodiments. The steps of the method 700 may be performed by a first wearable device (e.g., a wearable device 102a, FIGS. 1A-1B), a second wearable device (e.g., wearable device 102b, FIGS. 1A-1B), and a computer system (e.g., computer system 130, FIGS. 1A-1B). FIG. 7 corresponds to instructions stored in a computer memory or computer readable storage medium (e.g., memory 106 of the wearable device 102). For example, the operations of method 700 are performed, at least in part, by a communication module (e.g., communication module 218, FIG. 2), a projection generation module (e.g., projection module 232, FIG. 2), gesture detection modules (e.g., tactile gesture detection module 234, computer vision gesture detection module 238, FIG. 2), and/or location information modules (e.g., location information 236, 240, FIG. 2).

At a first wearable device (e.g., wearable device 102a) having a projector (e.g., projector 115, FIG. 2) and a plurality of transducers (e.g., transducers 410, FIG. 4) the first wearable device projects 702 (e.g., using projection module 232, FIG. 2), an image onto a portion of a first appendage (e.g., forearm) of a user of the first wearable device. The method further includes detecting 704 (e.g., via tactile gesture detection module 234) a touch gesture on the image by a second appendage of the user (e.g., a finger) distinct from the first appendage.

The method further comprises at a second wearable device (e.g., wearable device 102b) having a camera and a processor, determining 706 (e.g., via computer vision gesture detection module 238, FIG. 2) a location (e.g., via location information 240, FIG. 2) of the touch gesture on the image. In some embodiments, the second wearable device is an example the head-mounted device 140, the computer system 130, or a combination thereof. In some embodiments, the second wearable device (e.g., wearable device 102b) is integrated with one or more of the head-mounted device 140 and the computer system 130. In some other embodiments, the second wearable device (e.g., wearable device 102b) is distinct from the head-mounted device 140 and the computer system 130. In one example, the second wearable device is the AR system 1100 or the VR system 1200.

In some embodiments, the second wearable device confirms 708 that the detected touch gesture has occurred on the image by the second appendage of the user.

The method further comprises a computer system (e.g., computer system 130, FIGS. 1A-1B) is instructed to perform 710 an operation in accordance with the detecting and the location. In some embodiments, the computer system performs 712 the operation in accordance with the confirming that the detected touch gesture has occurred on the image by the second appendage of the user. For example, with reference to FIG. 6A, the first wearable device 102a projects the image 602 (e.g., user interface) onto the user's left forearm, and a second wearable device 102b worn on the user's head captures, via the camera 118, the user's right index finger interacting with the projected image 602. In this way, the second wearable device 102b determines a location of the touch gesture on the image (e.g., touch location 604 in FIG. 6B). Additionally, the first wearable device 102a is able to detect (sense) the right index finger interacting with the projected image 602 (e.g., sense the touch on the left forearm). Thus, the first and second wearable devices work together to detect the touch gesture on the image. Furthermore, the location of the touch gesture on the image may correspond to an affordance (or some other interface input), and the operation is associated with the affordance.

Figure 8:
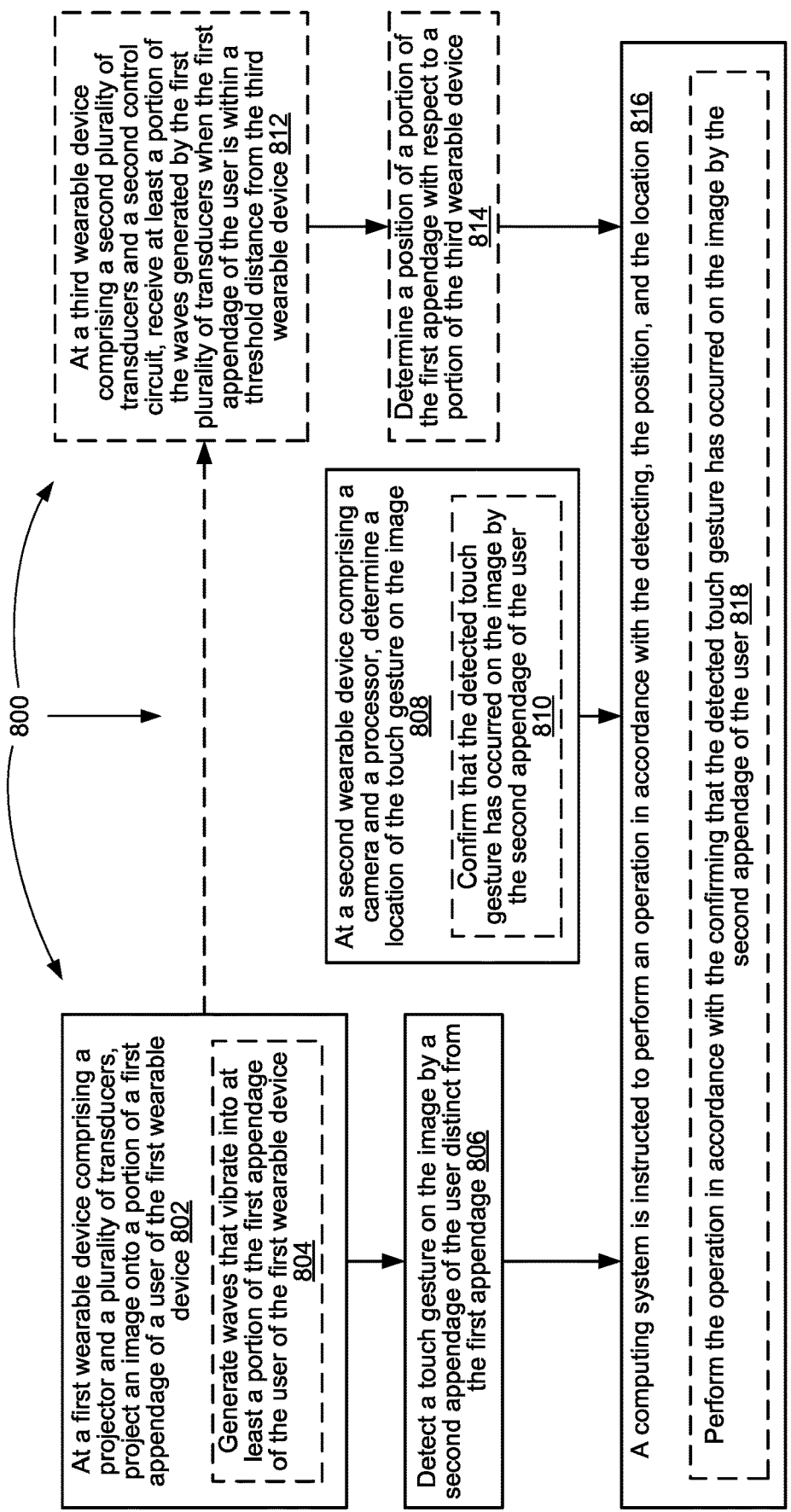
FIG. 8 is a flow diagram illustrating a method of confirming a touch on a user's body in accordance with some embodiments.

FIG. 8 is a flow diagram illustrating a method of projecting images onto a user's body in accordance with some embodiments. The steps of the method 800 may be performed by a first wearable device (e.g., a wearable device 102a, FIGS. 1A-1B), a second wearable device (e.g., wearable device 102b, FIGS. 1A-1B), a third wearable device (e.g., wearable device 102c, FIG. 1B) and a computer system (e.g., computer system 130, FIGS. 1A-1B). FIG. 8 corresponds to instructions stored in a computer memory or computer readable storage medium (e.g., memory 106 of the wearable device 102). For example, the operations of method 800 are performed, at least in part, by a communication module (e.g., communication module 218, FIG. 2), a projection generation module (e.g., projection module 232, FIG. 2), gesture detection modules (e.g., tactile gesture detection module 234, computer vision gesture detection module 238, FIG. 2), and/or location information modules (e.g., location information 236, 240, FIG. 2). It is noted that the steps of the method 800 can be performed in conjunction with the steps in method 700.

In some embodiments, a first wearable device (e.g., wearable device 102*a*) projects 802 an image onto a portion of a first appendage of a user of the first wearable device. In some embodiments, the first wearable device generates 804 signals that couple/vibrate into at least a portion of the first appendage of the user of the first wearable device. For example, FIG. 6C shows a first wearable device on the left wrist of the user which may generate signals that vibrate through the user's left arm/wrist/hand/fingers.

In some embodiments, a third wearable device (e.g., wearable device 102*c*) receives 812 at least a portion of the signals generated by the first plurality of transducers when the first appendage is within a threshold distance from the third wearable device. For example, FIG. 6C shows a user having a first wearable device on the left wrist, and a second wearable device on the right wrist. The first wearable device generates signals through the left wrist which the second wearable device on the right wrist receives when the first and second wearable devices are proximate to each other.

In some embodiments, the third wearable device determines 814 a position of a portion of the first appendage with respect to a portion of the third wearable device. For example, the third wearable device may have transducers that receives signals from the first wearable device at specific locations of the third wearable device. The received signal information may be analyzed by the control circuit of the wearable device to determine a position of a portion of the left arm with respect to the right arm.

In some embodiments, a second wearable device determines 808 a location of the touch gesture on the image. In some embodiments, the second wearable device confirms 810 that the detected touch gesture has occurred on the image by the second appendage of the user.

In some embodiments, a computer system (e.g., computer system 130, FIGS. 1A-1B) is instructed to perform 816 an operation in accordance with the detecting, the position, and the location. In some embodiments, the computer system performs 818 the operation in accordance with the confirming that the detected touch gesture has occurred on the image by the second appendage of the user.

Figure 9:
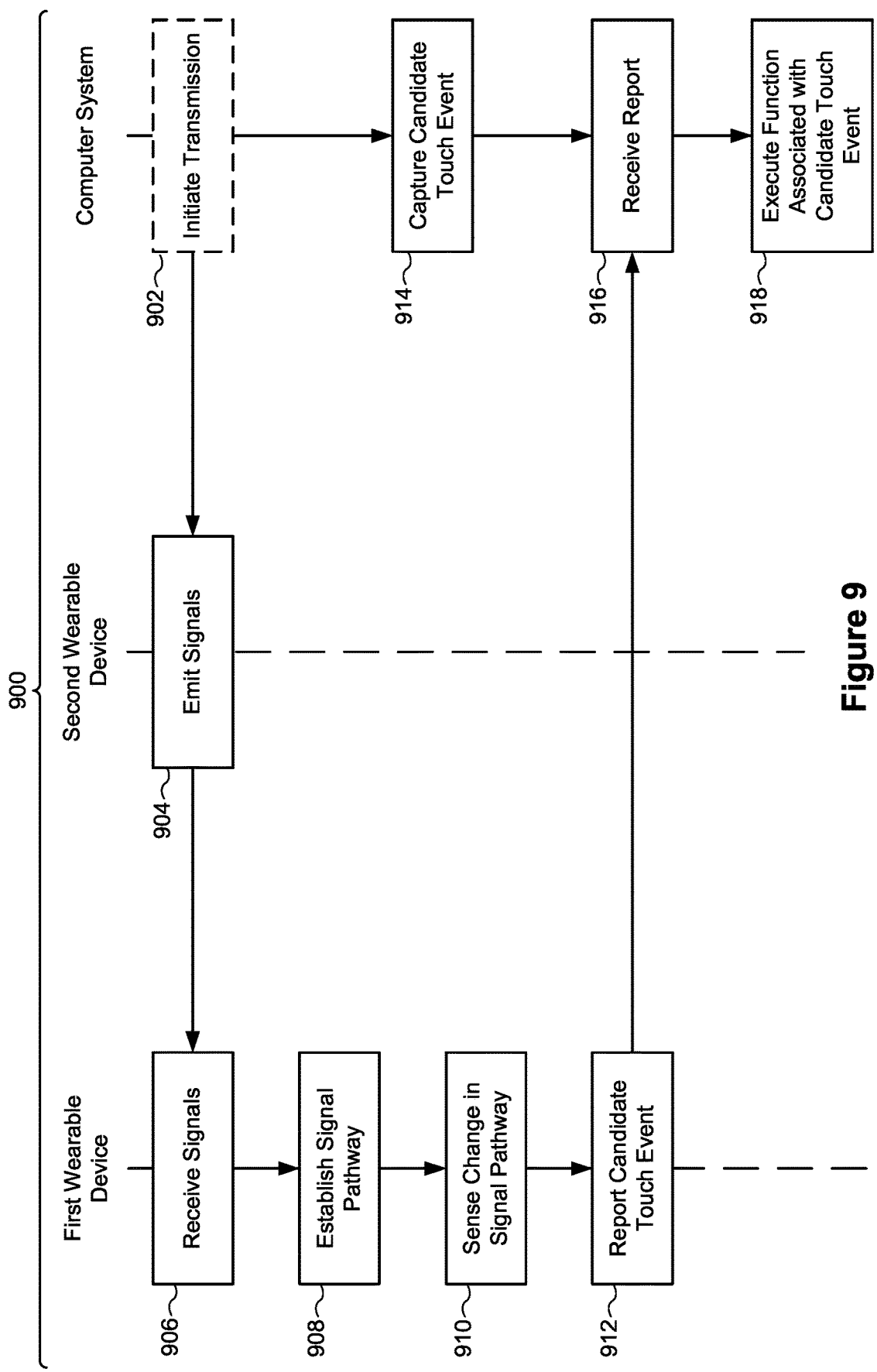
FIG. 9 is a high level flow diagram illustrating a method of detecting a touch on a user's body in accordance with some embodiments.

FIG. 9 is a high level flow diagram illustrating a method 900 of detecting a touch on a user's body in accordance with some embodiments. The steps of the method 900 may be performed by a first wearable device (e.g., instance of wearable device 102), a second wearable device (e.g., instance of wearable device 102), and a computer system (e.g., computer system 130). FIG. 9 corresponds to instructions stored in a computer memory or computer readable storage medium. For ease of discussion, the first wearable device is attached to a first appendage of the user, such as the user's wrist. In some embodiments, the second wearable device is also attached to the first appendage, while in other embodiments the second wearable device is attached elsewhere on the user's body (e.g., the user's other wrist, on the user's head, or various other places on the user's body). It is also noted that, in some embodiments, the computer system and the second wearable device may be part of the same device, while in other embodiments the computer system and the second wearable device are separate from each other.

In some embodiments, the method 900 begins with the computer system initiating (902) a signal transmission from the second wearable device. For example, the computer system may provide instructions to the second wearable device to emit one or more signals (e.g., acoustic waves). In some embodiments, the computer system initiates the signal transmission when the computer system is powered up. The computer system may also initiate the signal transmission when a trigger event occurs in a VR/AR application being run by the computer system. For example, when a user reaches a particular stage in a video game, the computer system may initiate the signal transmission.

The method 900 may also include the computer system providing instructions to a head-mounted display (e.g., head-mounted display 140, FIG. 1A) to display a user interface or other graphics/image(s) (e.g., interface 602, FIG. 6A) on the first appendage of the user. As discussed above, the user interface may be projected onto the first appendage or presented, using augmented reality, via the head-mounted display so that the user perceives the user interface on the first appendage. In some embodiments, the user may perform an action that triggers display of the user interface (and initiation of the signal transmission). For example, with reference to FIG. 6A, the user may move his arm and head to display positions (e.g., eyes pointed/aimed towards forearm while forearm is positioned in a viewing position).

Additionally, the computer system may receive motion information from sensors 114 of the first wearable device indicating that the user has moved (e.g., rotated) the first appendage while, in augmented reality (or virtual reality), a user interface (or some other augmented object) is being displayed on the user's first appendage. In such instances, the computer system generates content for the head-mounted display that mirrors and/or otherwise accounts for the user's movement in the augmented environment (e.g., the user interface in FIG. 6A rotates in accordance with the rotation of the user's forearm). In this way, the displayed user interface appears fixed to the first appendage. Moreover, the computer system may receive motion information from sensors 145 of the head-mounted display indicating that the user has moved his head while, in augmented reality (or virtual reality), the user interface is being displayed on the user's first appendage. In such instances, the computer system generates content for the head-mounted display that mirrors the user's movement in the augmented environment.

In some embodiments, the first and second wearable devices are transmitters and receivers. For example, when the first wearable device is attached to the user's left wrist and the second wearable device is attached to the user's right wrist, the first wearable device may act as a receiver and the second wearable device may act as a transmitter in first circumstances (e.g., when the user has his left arm and head in first display positions), while the first wearable device may act as a transmitter and the second wearable device may act as a receiver in second circumstances (e.g., when the user has his right arm and head in second display positions). In this way, the user can intuitively display a user interface (e.g., interface 602) on his left arm when desired, and leverage the first wearable device to confirm touches on the left arm, and also display another interface (or the same interface) on his right arm when desired, and leverage the second wearable device to confirm touches on the right arm. Accordingly, in some embodiments, the computer system determines that a respective appendage is in a predetermined display position (e.g., using at least the cameras 139) and that the user's head is aimed towards the respective appendage (e.g., using at least the cameras 139 or other sensors), and in response to making these determinations, the computer system instructs the head-mounted display to display a user interface on the respective appendage (e.g., as shown in FIG. 6A) and also instructs (step 902) at least one wearable device to emit signals, as described below.

The method 900 includes the second wearable device emitting (904) the one or more signals that propagate through at least the first appendage of the user (e.g., in response to receiving the instructions from the computer system). The method 900 also includes the first wearable device receiving (906) at least some of the one or more signals emitted by the second wearable device. In some embodiments, reception of the signals by the first wearable device establishes (908) a signal pathway between the first wearable device and the second wearable device. Furthermore, after establishing the signal path and while the second wearable device continues to emit the one or more signals, the method 900 further includes the first wearable device sensing (910) a change in the signal pathway (e.g., values of the set of signals received by the one or more transducers change). The sensed change in the signal pathway may be attributed to a touch event on the user's first appendage (e.g., user touches left forearm with right index finger) that interferes with the established signal pathway. In such a case, the first wearable device reports (912) a candidate touch event to the computer system. Alternatively, the sensed change in the signal pathway may be attributed to noise or some other non-touch event. In such a case, the first wearable device forgoes reporting a candidate touch event and continues to monitor the signal pathway. Method 1000, discussed below, describes the operations of method 900 performed by the first wearable device in more detail.

The method 900 further includes the computer system capturing (914) the candidate touch event. For example, one or more of the cameras 139 of the computer system 130 may capture the user's right index finger movement towards the user's left forearm, as illustrated in FIG. 6A. In some instances, capturing the touch candidate event includes capturing a location of the touch with respect to the displayed user interface.

In response to capturing the candidate touch event and receiving (916) the report of the candidate touch event from the first wearable device, the method 900 includes the computer system executing (918) a function associated with the candidate touch event. The computer system executes the function if it determines that the capturing of the candidate touch event and the report of the candidate touch event align (e.g., align in time and space). In other words, the report of the candidate touch event from the first wearable device is used by the computer system to confirm what the one or more cameras 139 captured (e.g., the cameras 139 may capture the touch location 604 (FIG. 6C) and the report of the candidate touch event from the first wearable device confirms contact with the left appendage). In this way, the computer system is able to distinguish a finger hovering above the user interface and a finger attempting to interact with the user interface (e.g., when a user merely hovers his finger above the interface, the cameras 139 alone struggle to distinguish the hovering from an actual touch event). In some embodiments, the displayed user interface includes one or more affordances, and the capturing of the candidate touch event indicates that the user intended to interact with a first affordance of the one or more affordances (e.g., interface 602 in FIG. 6A includes multiple affordances). In such embodiments, executing the function associated with the candidate touch event includes executing a function associated with the first affordance.

Figure 10:
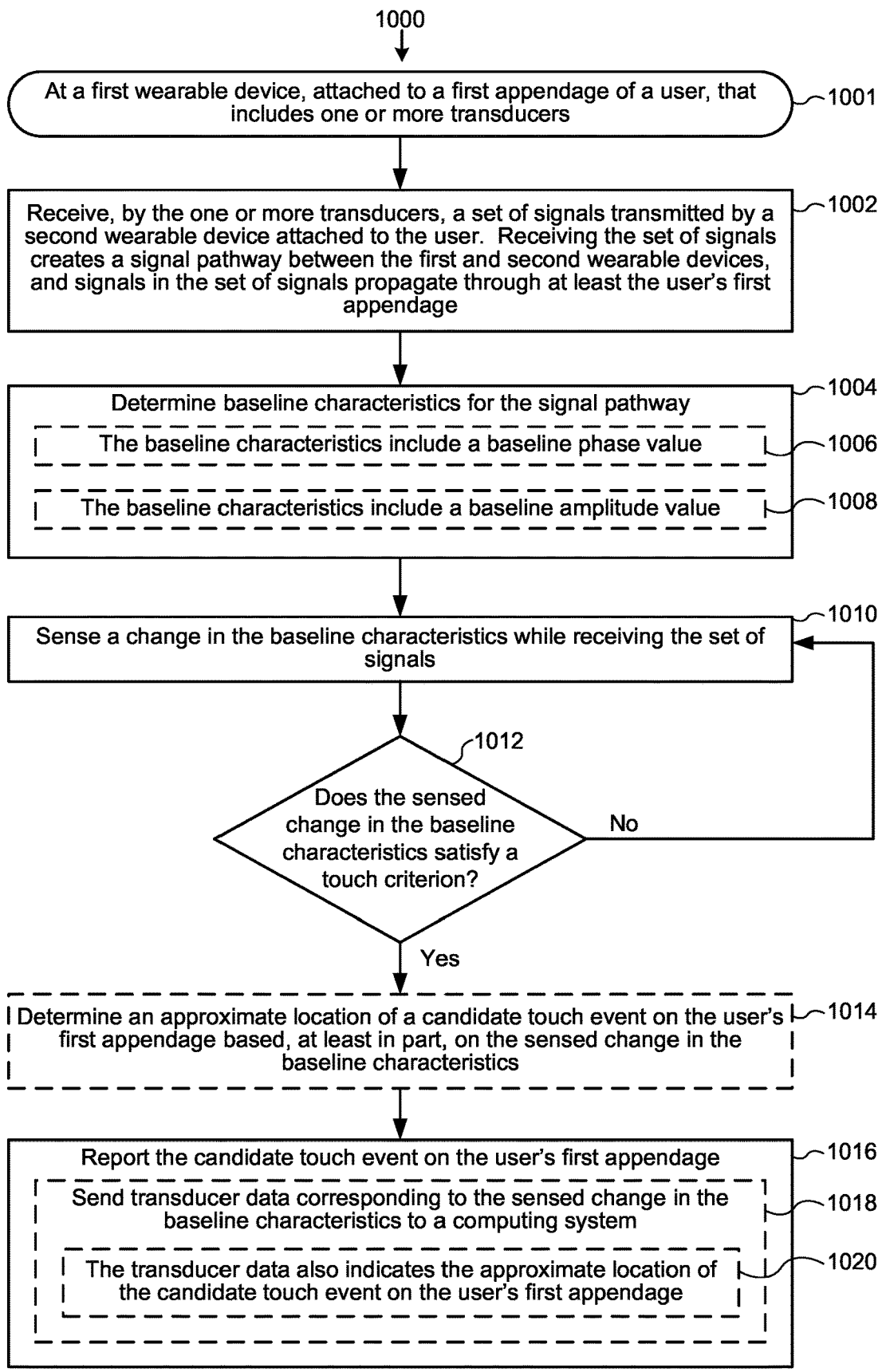
FIG. 10 is a flow diagram illustrating a method of confirming a touch on a user's body in accordance with some embodiments.

FIG. 10 is a flow diagram illustrating a method 1000 of confirming a touch on a user's body in accordance with some embodiments. The steps of the method 1000 may be performed by a first wearable device (e.g., instance of wearable device 102) that includes one or more transducers (e.g., transducers 410, FIG. 4) (1001). FIG. 10 corresponds to instructions stored in a computer memory or computer readable storage medium. For ease of discussion, the first wearable device is attached to a first appendage of the user, such as the user's wrist. It is noted that the steps of the method 1000 can be performed in conjunction with the steps in methods 700, 800, and 900.

In some embodiments, the method 1000 includes receiving (1002), by the one or more transducers of the first wearable device, a set of signals transmitted by a second wearable device attached to the user, where (i) receiving the set of signals creates a signal pathway between the first and second wearable devices, and (ii) signals in the set of signals propagate through at least the user's first appendage. In some embodiments, the second wearable device is also attached to the first appendage, while in other embodiments the second wearable device is attached elsewhere on the user's body (e.g., on another appendage or the user's head). To illustrate the signal pathway, with reference to FIG. 6C, signals generated by the second wearable device 102*c*, at least in some instances, travel (e.g., propagate, radiate) up the user's right arm, across the user's body, and down the user's left arm to be received by the first wearable device 102*a* (the generated signals at radiate towards the user's right-hand fingers). Thus, even if the user is not touching his left forearm with his right hand, the first wearable device 102*a* is still able to detect signals generated by the second wearable device 102*c*. It is noted that the signals generated by the second wearable device 102*c* may propagate (radiate) throughout the user's entire body.

In some embodiments, the method 1000 includes determining (1004) baseline characteristics for the signal pathway created between the first wearable device and the second wearable device. The baseline characteristics may include values for phase, amplitude, frequency, etc. associated with the signals received by the first wearable device. Accordingly, in some embodiments, the baseline characteristics include a baseline phase value (1006), a baseline amplitude phase (1008), and/or a baseline frequency value (among other waveform characteristics). In some embodiments, the baseline characteristics are determined during a calibration process of the user, and it is noted that baseline characteristics may vary from user to user based on bodily differences between users (e.g., bodily tissue and bone structure will vary from user to user, creating different impedances to the signals radiating through the body).

In some embodiments, the method 1000 includes sensing (detecting, measuring) (1010) a change in the baseline characteristics while receiving the set of signals. For example, when the baseline characteristics include the baseline phase value, sensing the change in the baseline characteristics for the signal pathway includes detecting a phase value of the signal pathway that differs from the baseline phase value. In another example (or in addition to the previous example), when the baseline characteristics include the baseline amplitude value, sensing the change in the baseline characteristics for the signal pathway includes detecting an amplitude value of the signal pathway that differs from the baseline amplitude value.

In some embodiments, the method 1000 includes determining (1012) whether the sensed change in the baseline characteristics satisfies a contact criterion (or in some embodiments, contact criteria). To provide some context, in some instances, the sensed change in the baseline characteristics is attributable to a touch on the first appendage by the user that interferes with the established signal pathway (e.g., the touch impedes the signal pathway). Additionally, using the wearable device arrangement in FIG. 6C as an example, it is noted that when the user touches his left forearm with his right index finger, additional signals may propagate from the right index finger into the left forearm at the touch location, thereby causing (or at minimum contributing to) the interference of the signal pathway. However, in some other instances, the sensed change in the baseline characteristics is attributable to noise, or the user hovering his finger above the first appendage. Accordingly, the first wearable device compares the sensed change with contact criterion to distinguish intended touches from other events.

In some embodiments, in accordance with a determination that the sensed change in the baseline characteristics for the signal pathway does not satisfy the contact criterion (1012-No), the method 1000 includes continuing to sense for changes in the baseline characteristics that may satisfy the contact criterion. Sensed changes in the baseline characteristics that do not satisfy the contact criterion may be attributable to noise or quick contacts (e.g., brushes) between appendages. In some embodiments, the contact criterion includes: (i) a touch criterion that is set to be satisfied by touches but not hovering events, and (ii) a hovering criterion that is set to be satisfied by hovering events but not touches. Various examples of the contact criterion are provided below.

In some embodiments, in accordance with a determination that the sensed change in the baseline characteristics for the signal pathway satisfies the contact criterion (1012-Yes), the method 1000 includes reporting (1016) a candidate touch event on the user's first appendage. In some embodiments, reporting the candidate touch event includes sending a message (e.g., a report) to a computer system (e.g., computer system 130) that a candidate touch event was sensed and confirmed (i.e., a touch confirmed flag is sent). The message may also include a timestamp of when the change in the baseline characteristics were sensed (and/or a duration of the sensed change). The candidate touch event may be any one of a tap gesture, a swipe gesture, a pinch gesture, a pull gesture, or a twist gesture. It is also noted that, in some embodiments, the computer system and the second wearable device may be part of the same device, while in other embodiments the computer system and the second wearable device are separate from each other.

In some embodiments, the contact criterion includes a phase difference threshold. In such embodiments, reporting the candidate touch event is performed in accordance with a determination that a difference between the detected phase value (from step 1010) and the baseline phase value satisfies the phase difference threshold. In some embodiments, the contact criterion includes an amplitude difference threshold. In such embodiments, reporting the candidate touch event is performed in accordance with a determination that a difference between the detected amplitude value (from step 1010) and the baseline amplitude value satisfies the amplitude difference threshold. In another embodiment, the contact criteria include an amplitude difference threshold and a phase difference threshold. In such embodiments, reporting the candidate touch event is performed in accordance with a determination that: (i) a difference between the detected amplitude value and the baseline amplitude value satisfies the amplitude difference threshold, and (ii) a difference between the detected phase value and the baseline phase value satisfies the phase difference threshold. In addition to or separately from the embodiments above, the contact criterion may also include a time threshold. In such embodiments, sensing (1010) the change in the baseline characteristics includes sensing the change for a period of time (i.e., a duration of the sensed change is determined) and reporting the candidate touch event is performed in accordance with a determination that the period of time satisfies the time threshold. The time threshold can be used to filter out noise, as well as accidental/unintentional touching of the first appendage (e.g., a quick brushing of the first appendage with the second appendage can be filtered out).

As noted above, the contact criterion may include a touch criterion and a hovering criterion. In some embodiments, the contact criterion includes a first phase difference threshold for the touch criterion and a second phase difference threshold for the hovering criterion. The first phase difference threshold differs (e.g., is larger than) from that of the second phase difference threshold. Accordingly, in some embodiments, the method 1000 includes reporting a candidate hovering event in accordance with a determination that a difference between the detected phase value (from step 1010) and the baseline phase value satisfies the second phase difference threshold but does not satisfy the first phase threshold. The contact criterion can also include a first amplitude difference threshold for the touch criterion and a second amplitude difference threshold for the hovering criterion. The first amplitude difference threshold differs (e.g., is larger than) from that of the second amplitude difference threshold. The steps below discuss how the "candidate touch event" can similarly be performed in circumstances when the first wearable device reports a candidate hovering event instead of the candidate touch event.

In some embodiments, reporting the candidate touch event includes sending transducer (and/or sensor) data corresponding to the sensed change in the baseline characteristics to the computer system (e.g., computer system 130) (1018). In some embodiments, the transducer (and/or sensor) data includes a time stamp (and/or a duration) associated with sensing the change in the baseline characteristics. Additionally, in some embodiments, the transducer (and/or sensor) data includes the sensed change in the baseline characteristics (e.g., values for phase, amplitude, etc.). In some embodiments, the computer system uses the transducer (and/or sensor) data to confirm that a touch event occurred. Furthermore, in some embodiments, the computer system uses the transducer (and/or sensor) data to determine an approximate location of the candidate touch event on the user's first appendage. For example, the values for phase, amplitude, etc. may indicate the approximate location of the candidate touch event on the user's first appendage.

As discussed above with reference to the method 900, the computer system may display, on the user's first appendage, a user interface that includes one or more affordances, and the candidate touch event may be associated with a first affordance of the one or more affordances included in the user interface. The computer system may use the data/information/report associated with the sensed change in the baseline characteristics to confirm whether a touch event with the displayed user interface occurred. Put another way, the computer system determines whether the user intended to interact with an affordance of the user interface displayed on the user's first appendage based, at least in part, on the data/information/report associated with the sensed change in the signal pathway received from the first wearable device.

In addition, the computer system may capture, via one or more cameras (e.g., cameras 139, FIG. 1A), the candidate touch event, and generate image data according to the capturing of the candidate touch event. In this way, the computer system may determine an approximate location of the candidate touch event on the user's first appendage based on the image data. Additionally, the computer system may determine whether the captured movements of the user amount to a candidate touch event (e.g., the second appendage comes within a threshold distance from the first appendage, or the second appendage visually obstructs a portion of the first appendage where the user interface is displayed). The computer system may then use data/information/report received from the first wearable device (step 1012-Yes) to confirm that the candidate touch event is an actual touch event. The computer system then executes a function associated with the first affordance of the user interface (i) if the data/information/report associated with the sensed change in the signal pathway received from the first wearable device confirms that the user intended to interact with the first affordance and (ii) if the image data confirms that the user intended to interact with the first affordance. This dual confirmation process creates a robust approach to detecting touch events (and hovering events) with artificial user interfaces.

In some embodiments, if the computer system receives the reporting of the candidate touch event from the first wearable device within a time window of capturing the candidate touch event, the computer system executes the function. The time window may be a predefined time window. In some embodiments, the computer system tracks a time frame of when the candidate touch event could have occurred, based on the image data (i.e., generates a time frame of when the touch event could have occurred). In such embodiments, if the time stamp included in the data/information/report received from the first wearable device falls within the time frame, the computer system executes the function. It is noted that each of the one or more affordances of the displayed user interface may have a unique function.

In some embodiments, the transducer data sent to the computer system further includes information indicating an approximate location of the candidate touch event (1020). For example, the first wearable device may determine (1014) the approximate location of the candidate touch event on the user's first appendage based, at least in part, on the sensed change in the baseline characteristics. This can be accomplished by evaluating a phase value (and/or an amplitude value) of the signal pathway. For example, one or more first phase values (and/or one or more first amplitude values) may indicate that the user touched close to his wrist, whereas one or more second phase values (and/or one or more second amplitude values) different from the one or more first phase values (or the one or more first amplitude values) may indicate that the user touched close to his elbow. Additionally, in some embodiments, the first wearable device may include one or more cameras 118 that capture the candidate touch event.

In some embodiments, instead of the first wearable device monitoring changes in an established signal path, the first wearable device determines that a candidate touch event has occurred based on the baseline characteristics of the signal pathway. In other words, values of phase, amplitude, etc. of the set of signals received by the one or more transducers themselves may indicate that a candidate touch event has occurred.

Embodiments of the instant disclosure may include or be implemented in conjunction with various types of artificial reality systems. Artificial reality may constitute a form of reality that has been altered by virtual objects for presentation to a user. Such artificial reality may include and/or represent VR, AR, MR, hybrid reality, or some combination and/or variation of one or more of the same. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to a viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 1100 in FIG. 11. Other artificial reality systems may include an NED that also provides visibility into the real world (e.g., AR system 1200 in FIG. 12) or that visually immerses a user in an artificial reality (e.g., VR system 1300 in FIG. 13). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user (e.g., wearable device 102a, wearable device 102b, . . . wearable device 102n), devices worn by one or more other users, and/or any other suitable external system.

FIGS. 11-13 provide additional examples of the devices used in the system 100. AR system 1100 in FIG. 11 generally represents a wearable device dimensioned to fit about a body part (e.g., a head) of a user. The AR system 1100 may include the functionality of the wearable device 102, and may include additional functions. As shown, the AR system 1100 includes a frame 1102 (e.g., band) and a camera assembly 1104 that is coupled to frame 1102 and configured to gather information about a local environment by observing the local environment. The AR system 1100 may also include one or more transducers (e.g., instances of the transducers 410, FIG. 4). In one example, the AR system 1100 includes output transducers 1108(A) and 1108(B) and input transducers 1110. Output transducers 1108(A) and 1108(B) may provide audio feedback, haptic feedback, and/or content to a user, and input audio transducers may capture audio (or other signals/waves) in a user's environment. In some embodiments, the camera assembly 1104 includes one or more projectors (e.g., projectors 115) that allows the AR system 1100 to project images (e.g., if the AR system 1100 is worn on the user's wrist, then the camera assembly 1104 can project images onto the user's wrist and forearm).

Thus, the AR system 1100 does not include a near-eye display (NED) positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the AR system 1100 may not include an NED, the AR system 1100 may include other types of screens or visual feedback devices (e.g., a display screen integrated into a side of frame 1102).

The embodiments discussed in this disclosure may also be implemented in AR systems that include one or more NEDs. For example, as shown in FIG. 12, the AR system 1200 may include an eyewear device 1202 with a frame 1210 configured to hold a left display device 1215(A) and a right display device 1215(B) in front of a user's eyes. Display devices 1215(A) and 1215(B) may act together or independently to present an image or series of images to a user. While the AR system 1200 includes two displays, embodiments of this disclosure may be implemented in AR systems with a single NED or more than two NEDs.

In some embodiments, the AR system 1200 may include one or more sensors, such as sensor 1240. Sensor 1240 may generate measurement signals in response to motion of AR system 1200 and may be located on substantially any portion of frame 1210. Sensor 1240 may include a position sensor, an inertial measurement unit (IMU), a depth camera assembly, or any combination thereof. In some embodiments, the AR system 1200 may or may not include sensor 1240 or may include more than one sensor. In embodiments in which sensor 1240 includes an IMU, the IMU may generate calibration data based on measurement signals from sensor 1240. Examples of sensor 1240 may include, without limitation, accelerometers, gyroscopes, magnetometers, other suitable types of sensors that detect motion, sensors used for error correction of the IMU, or some combination thereof. Sensors are also discussed above with reference to FIG. 1 (e.g., sensors 145 of the head-mounted display 140).

The AR system 1200 may also include a microphone array with a plurality of acoustic sensors 1220(A)-1220(J), referred to collectively as acoustic sensors 1220. Acoustic sensors 1220 may be transducers that detect air pressure variations induced by sound waves. Each acoustic sensor 1220 may be configured to detect sound and convert the detected sound into an electronic format (e.g., an analog or digital format). The microphone array in FIG. 12 may include, for example, ten acoustic sensors: 1220(A) and 1220(B), which may be designed to be placed inside a corresponding ear of the user, acoustic sensors 1220(C), 1220(D), 1220(E), 1220(F), 1220(G), and 1220(H), which may be positioned at various locations on frame 1210, and/or acoustic sensors 1220(I) and 1220(J), which may be positioned on a corresponding neckband 1205. In some embodiments, the neckband 1205 is an example of the computer system 130.

The configuration of acoustic sensors 1220 of the microphone array may vary. While the AR system 1200 is shown in FIG. 12 as having ten acoustic sensors 1220, the number of acoustic sensors 1220 may be greater or less than ten. In some embodiments, using higher numbers of acoustic sensors 1220 may increase the amount of audio information collected and/or the sensitivity and accuracy of the audio information. In contrast, using a lower number of acoustic sensors 1220 may decrease the computing power required by a controller 1250 to process the collected audio information. In addition, the position of each acoustic sensor 1220 of the microphone array may vary. For example, the position of an acoustic sensor 1220 may include a defined position on the user, a defined coordinate on the frame 1210, an orientation associated with each acoustic sensor, or some combination thereof.

Acoustic sensors 1220(A) and 1220(B) may be positioned on different parts of the user's ear, such as behind the pinna or within the auricle or fossa. Or, there may be additional acoustic sensors on or surrounding the ear in addition to acoustic sensors 1220 inside the ear canal. Having an acoustic sensor positioned next to an ear canal of a user may enable the microphone array to collect information on how sounds arrive at the ear canal. By positioning at least two of acoustic sensors 1220 on either side of a user's head (e.g., as binaural microphones), the AR device 1200 may simulate binaural hearing and capture a 3D stereo sound field around about a user's head. In some embodiments, the acoustic sensors 1220(A) and 1220(B) may be connected to the AR system 1200 via a wired connection, and in other embodiments, the acoustic sensors 1220(A) and 1220(B) may be connected to the AR system 1200 via a wireless connection (e.g., a Bluetooth connection). In still other embodiments, acoustic sensors 1220(A) and 1220(B) may not be used at all in conjunction with the AR system 1200.

Acoustic sensors 1220 on frame 1210 may be positioned along the length of the temples, across the bridge, above or below display devices 1215(A) and 1215(B), or some combination thereof. Acoustic sensors 1220 may be oriented such that the microphone array is able to detect sounds in a wide range of directions surrounding the user wearing AR system 1200. In some embodiments, an optimization process may be performed during manufacturing of AR system 1200 to determine relative positioning of each acoustic sensor 1220 in the microphone array.

The AR system 1200 may further include or be connected to an external device (e.g., a paired device), such as neckband 1205. As shown, neckband 1205 may be coupled to eyewear device 1202 via one or more connectors 1230. Connectors 1230 may be wired or wireless connectors and may include electrical and/or non-electrical (e.g., structural) components. In some cases, eyewear device 1202 and neckband 1205 may operate independently without any wired or wireless connection between them. While FIG. 12 illustrates the components of eyewear device 1202 and neckband 1205 in example locations on eyewear device 1202 and neckband 1205, the components may be located elsewhere and/or distributed differently on eyewear device 1202 and/or neckband 1205. In some embodiments, the components of eyewear device 1202 and neckband 1205 may be located on one or more additional peripheral devices paired with eyewear device 1202, neckband 1205, or some combination thereof. Furthermore, neckband 1205 generally represents any type or form of paired device. Thus, the following discussion of neckband 1205 may also apply to various other paired devices, such as smart watches, smart phones, wrist bands, other wearable devices, hand-held controllers, tablet computers, laptop computers, etc.

Pairing external devices, such as neckband 1205, with AR eyewear devices may enable the eyewear devices to achieve the form factor of a pair of glasses while still providing sufficient battery and computation power for expanded capabilities. Some or all of the battery power, computational resources, and/or additional features of the AR system 1200 may be provided by a paired device or shared between a paired device and an eyewear device, thus reducing the weight, heat profile, and form factor of the eyewear device overall while still retaining desired functionality. For example, neckband 1205 may allow components that would otherwise be included on an eyewear device to be included in neckband 1205 since users may tolerate a heavier weight load on their shoulders than they would tolerate on their heads. Neckband 1205 may also have a larger surface area over which to diffuse and disperse heat to the ambient environment. Thus, neckband 1205 may allow for greater battery and computation capacity than might otherwise have been possible on a stand-alone eyewear device. Since weight carried in neckband 1205 may be less invasive to a user than weight carried in eyewear device 1202, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

Neckband 1205 may be communicatively coupled with eyewear device 1202 and/or to other devices. The other devices may provide certain functions (e.g., tracking, localizing, depth mapping, processing, storage, etc.) to the AR system 1200. In the embodiment of FIG. 12, neckband 1205 may include two acoustic sensors (e.g., 1220(I) and 1220(J)) that are part of the microphone array (or potentially form their own microphone subarray). Neckband 1205 may also include a controller 1225 and a power source 1235.

Acoustic sensors 1220(I) and 1220(J) of neckband 1205 may be configured to detect sound and convert the detected sound into an electronic format (analog or digital). In the embodiment of FIG. 12, acoustic sensors 1220(I) and 1220 (J) may be positioned on neckband 1205, thereby increasing the distance between neckband acoustic sensors 1220(I) and 1220(J) and other acoustic sensors 1220 positioned on eyewear device 1202. In some cases, increasing the distance between acoustic sensors 1220 of the microphone array may improve the accuracy of beamforming performed via the microphone array. For example, if a sound is detected by acoustic sensors 1220(C) and 1220(D) and the distance between acoustic sensors 1220(C) and 1220(D) is greater than, e.g., the distance between acoustic sensors 1220(D) and 1220(E), the determined source location of the detected sound may be more accurate than if the sound had been detected by acoustic sensors 1220(D) and 1220(E).

Controller 1225 of neckband 1205 may process information generated by the sensors on neckband 1205 and/or AR system 1200. For example, controller 1225 may process information from the microphone array that describes sounds detected by the microphone array. For each detected sound, controller 1225 may perform a direction of arrival (DOA) estimation to estimate a direction from which the detected sound arrived at the microphone array. As the microphone array detects sounds, controller 1225 may populate an audio data set with the information. In embodiments in which AR system 1200 includes an IMU, controller 1225 may compute all inertial and spatial calculations from the IMU located on eyewear device 1202. Connector 1230 may convey information between AR system 1200 and neckband 1205 and between AR system 1200 and controller 1225. The information may be in the form of optical data, electrical data, wireless data, or any other transmittable data form. Moving the processing of information generated by AR system 1200 to neckband 1205 may reduce weight and heat in eyewear device 1202, making it more comfortable to a user.

Power source 1235 in neckband 1205 may provide power to eyewear device 1202 and/or to neckband 1205. Power source 1235 may include, without limitation, lithium-ion batteries, lithium-polymer batteries, primary lithium batteries, alkaline batteries, or any other form of power storage. In some cases, power source 1235 may be a wired power source. Including power source 1235 on neckband 1205 instead of on eyewear device 1202 may help better distribute the weight and heat generated by power source 1235.

As noted, some artificial reality systems may, instead of blending an artificial reality with actual reality, substantially replace one or more of a user's sensory perceptions of the real world with a virtual experience. One example of this type of system is a head-worn display system, such as VR system 1300 in FIG. 13, that mostly or completely covers a user's field of view. VR system 1300 may include a front rigid body 1302 and a band 1304 shaped to fit around a user's head. VR system 1300 may also include output audio transducers 1306(A) and 1306(B). Furthermore, while not shown in FIG. 13, front rigid body 1302 may include one or more electronic elements, including one or more electronic displays, one or more IMUs, one or more tracking emitters or detectors, and/or any other suitable device or system for creating an artificial reality experience. Although not shown, the VR system 1300 may include the computer system 130.

Artificial reality systems may include a variety of types of visual feedback mechanisms. For example, display devices in AR system 1200 and/or VR system 1300 may include one or more liquid-crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 1200 and/or VR system 1300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 1100, AR system 1200, and/or VR system 1300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 11 and 13, output audio transducers 1108 (A), 1108(B), 1106(A), and 1306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1110 may include condenser microphones, dynamic microphones, ribbon microphones, and/or any other type or form of input transducer. In some embodiments, a single transducer may be used for both audio input and audio output.

The artificial reality systems shown in FIGS. 11-13 may include tactile (i.e., haptic) feedback systems, which may be incorporated into headwear, gloves, body suits, handheld controllers, environmental devices (e.g., chairs, floormats, etc.), and/or any other type of device or system, such as the wearable devices 102 discussed herein. Additionally, in some embodiments, the haptic feedback systems may be incorporated with the artificial reality systems (e.g., the AR system 1100 may include the wearable device 102 (FIG. 1). Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, vision aids, etc.). The embodiments disclosed herein may enable or enhance a user's artificial reality experience in one or more of these contexts and environments and/or in other contexts and environments.

Some AR systems may map a user's environment using techniques referred to as "simultaneous location and mapping" (SLAM). SLAM mapping and location identifying techniques may involve a variety of hardware and software tools that can create or update a map of an environment while simultaneously keeping track of a device's or a user's location and/or orientation within the mapped environment. SLAM may use many different types of sensors to create a map and determine a device's or a user's position within the map.

SLAM techniques may, for example, implement optical sensors to determine a device's or a user's location, position, or orientation. Radios including WiFi, Bluetooth, global positioning system (GPS), cellular or other communication devices may also be used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. AR and VR devices (such as systems 1100, 1200, and 1300) may incorporate any or all of these types of sensors to perform SLAM operations such as creating and continually updating maps of a device's or a user's current environment. In at least some of the embodiments described herein, SLAM data generated by these sensors may be referred to as "environmental data" and may indicate a device's or a user's current environment. This data may be stored in a local or remote data store (e.g., a cloud data store) and may be provided to a user's AR/VR device on demand.

When the user is wearing an AR headset or VR headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to herein as "localization," and the process of rendering playback of the audio source signal to appear as if it is coming from a specific direction may be referred to herein as "spatialization."

Localizing an audio source may be performed in a variety of different ways. In some cases, an AR or VR headset may initiate a DOA analysis to determine the location of a sound source. The DOA analysis may include analyzing the intensity, spectra, and/or arrival time of each sound at the AR/VR device to determine the direction from which the sound originated. In some cases, the DOA analysis may include any suitable algorithm for analyzing the surrounding acoustic environment in which the artificial reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial reality device may provide an alignment and orientation guide, which the user may follow to customize the sound signal presented to the user based on their unique HRTF. In some embodiments, an AR or VR device may implement one or more microphones to listen to sounds within the user's environment. The AR or VR device may use a variety of different array transfer functions (ATFs) (e.g., any of the DOA algorithms identified above) to estimate the direction of arrival for the sounds. Once the direction of arrival has been determined, the artificial reality device may play back sounds to the user according to the user's unique HRTF. Accordingly, the DOA estimation generated using an ATF may be used to determine the direction from which the sounds are to be played from. The playback sounds may be further refined based on how that specific user hears sounds according to the HRTF.

In addition to or as an alternative to performing a DOA estimation, an artificial reality device may perform localization based on information received from other types of sensors. These sensors may include cameras, infrared radiation (IR) sensors, heat sensors, motion sensors, global positioning system (GPS) receivers, or in some cases, sensor that detect a user's eye movements. For example, an artificial reality device may include an eye tracker or gaze detector that determines where a user is looking. Often, a user's eyes will look at the source of a sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an acoustic transfer function may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to a user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

It is noted that the embodiments disclosed herein can also be combined with any of the embodiments described in U.S. Provisional Application No. 62/647,559, filed Mar. 23, 2018, entitled "Methods, Devices, and Systems for Determining Contact On a User of a Virtual Reality and/or Augmented Reality Device;" U.S. Provisional Application No. 62/636,699, filed Feb. 28, 2018, entitled "Methods, Devices, and Systems for Creating Haptic Stimulations and Tracking Motion of a User;" and U.S. Provisional Application No. 62/614,790, filed Jan. 8, 2018, entitled "Methods, Devices, and Systems for Creating Localized Haptic Sensations on a User."

It also is noted that the embodiments disclosed herein can also be combined with any of the embodiments described in U.S. Utility patent application Ser. No. 16/241,871, entitled "Methods, Devices, and Systems for Creating Haptic Stimulations and Tracking Motion of a User," filed Jan. 7, 2019, U.S. Utility patent application Ser. No. 16/241,890, entitled "Methods, Devices, and Systems for Determining Contact On a User of a Virtual Reality and/or Augmented Reality Device," filed Jan. 7, 2019, and U.S. Utility patent application Ser. No. 16/241,900, entitled "Methods, Devices, and Systems for Creating Localized Haptic Sensations on a User," filed Jan. 7, 2019.

What is claimed is:

1. A method, comprising:
    at a wearable device that includes one or more transducers:
        receiving, by the one or more transducers, a set of signals that establish a signal pathway to the wearable device;
        while receiving the set of signals:
            determining baseline characteristics for the signal pathway; and
            sensing, in the set of signals, a change from baseline characteristics for the signal pathway caused by user interaction with a projected affordance of a user interface; and
        in accordance with a determination that the sensed change in the baseline characteristics for the signal pathway satisfies a contact criterion, reporting a candidate touch event to a separate electronic device, wherein the separate electronic device creates the user interface or is in communication with another electronic device that creates the user interface.

2. The method of claim 1, wherein reporting the candidate touch event comprises sending transducer data corresponding to the sensed change in the baseline characteristics to the separate electronic device.

3. The method of claim 2, further comprising, at the wearable device:
    determining an approximate location of the candidate touch event based, at least in part, on the sensed change in the baseline characteristics, wherein the transducer data sent to the separate electronic device further comprises information indicating the approximate location of the candidate touch event.

4. The method of claim 2, wherein the transducer data sent to the separate electronic device also indicates an approximate location of the candidate touch event.

5. The method of claim 2, further comprising:
capturing, via one or more cameras of the separate electronic device, the candidate touch event;
generating, by the separate electronic device, image data according to the capturing of the candidate touch event; and
executing, by the separate electronic device, a function associated with the affordance of the user interface after processing the transducer data and the image data.

6. The method of claim 1, further comprising:
displaying, by the separate electronic device, the affordance of the user interface on a user's appendage.

7. The method of claim 6, further comprising, at the wearable device:
before receiving the set of signals:
receiving a plurality of predetermined values for signal characteristics, wherein each of the predetermined values for the signal characteristics corresponds to a specific location of the appendage of the user.

8. The method of claim 6, wherein:
reporting the candidate touch event comprises sending, to the separate electronic device, data associated with the sensed change in the signal pathway; and
the separate electronic device determines whether the user intended to interact with the affordance of the user interface displayed on the user's appendage based, at least in part, on the data associated with the sensed change in the signal pathway.

9. The method of claim 1, wherein:
the baseline characteristics include a baseline phase value; and
sensing the change in the baseline characteristics for the signal pathway comprises detecting a phase value of the signal pathway that differs from the baseline phase value.

10. The method of claim 9, wherein:
the contact criterion includes a phase difference threshold; and
reporting the candidate touch event is performed in accordance with a determination that a difference between the phase value and the baseline phase value satisfies the phase difference threshold.

11. The method of claim 1, wherein:
the baseline characteristics include a baseline amplitude value; and
sensing the change in the baseline characteristics for the signal pathway comprises detecting an amplitude value of the signal pathway that differs from the baseline amplitude value.

12. The method of claim 11, wherein:
the contact criterion includes an amplitude difference threshold; and
reporting the candidate touch event is performed in accordance with a determination that a difference between the amplitude value and the baseline amplitude value satisfies the amplitude difference threshold.

13. The method of claim 1, wherein:
the baseline characteristics include a baseline amplitude value and a baseline phase value; and
sensing the change in the baseline characteristics for the signal pathway comprises detecting (i) an amplitude value of the signal pathway that differs from the baseline amplitude value, and (ii) a phase value of the signal pathway that differs from the baseline phase value.

14. The method of claim 13, wherein:
the contact criterion includes an amplitude difference threshold and a phase difference threshold; and
reporting the candidate touch event is performed in accordance with a determination that: (i) a difference between the amplitude value and the baseline amplitude value satisfies the amplitude difference threshold, and (ii) a difference between the phase value and the baseline phase value satisfies the phase difference threshold.

15. The method of claim 1, wherein:
the contact criterion includes a time threshold;
sensing the change in the baseline characteristics comprises sensing the change for a period of time; and
reporting the candidate touch event is performed in accordance with a determination that the period of time satisfies the time threshold.

16. The method of claim 1, wherein the candidate touch event is selected from the group consisting of: a tap gesture, a press-and-hold gesture, a multi-tap gesture, a swipe gesture, a drag gesture, a pinch gesture, a pull gesture, a hover, and a twist gesture.

17. The method of claim 1, wherein the separate electronic device is an artificial-reality system selected from the group consisting of: an augmented-reality system, a virtual-reality system, and a mixed-reality system.

18. A wearable device comprising:
one or more transducers;
one or more processors; and
memory storing one or more programs, which when executed by the one or more processors cause the wearable device to:
receive, by the one or more transducers, a set of signals that establish a signal pathway to the wearable device;
while receiving the set of signals:
determine baseline characteristics for the signal pathway; and
sense a change in the baseline characteristics caused by user interaction with an affordance of a projected user interface; and
in accordance with a determination that the sensed change in the baseline characteristics for the signal pathway satisfies a contact criterion, report a candidate touch event to a separate electronic device, wherein the separate electronic device creates the user interface or is in communication with another electronic device that creates the user interface.

19. A non-transitory computer-readable storage medium storing one or more programs configured for execution by one or more processors of a wearable device having one or more transducers, the one or more programs including instructions, which when executed by the one or more processors, cause the wearable device to:
receive, by the one or more transducers, a set of signals that establish a signal pathway to the wearable device;
while receiving the set of signals:
determine baseline characteristics for the signal pathway; and
sense a change in the baseline characteristics caused by user interaction with an affordance of a projected user interface; and in accordance with a determination that the sensed change in the baseline characteristics for the signal pathway satisfies a contact criterion, report a candidate touch event to a separate electronic device, wherein the separate electronic device creates the user interface or is in communication with another electronic device that creates the user interface.

* * * * *